US012676709B2

(12) United States Patent
Dutta et al.

(10) Patent No.: US 12,676,709 B2
(45) Date of Patent: Jul. 7, 2026

(54) SIDELINK RECEPTION WITH MULTIPLE TRANSMISSION RECEPTION POINTS

(71) Applicant: QUALCOMM INCORPORATED, San Diego, CA (US)

(72) Inventors: Sourjya Dutta, San Diego, CA (US); Kapil Gulati, Belle Mead, NJ (US); Shuanshuan Wu, San Diego, CA (US); Junyi Li, Fairless Hills, PA (US); Hui Guo, Beijing (CN); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 553 days.

(21) Appl. No.: 18/006,722

(22) PCT Filed: Sep. 30, 2020

(86) PCT No.: PCT/CN2020/119401
§ 371 (c)(1),
(2) Date: Jan. 24, 2023

(87) PCT Pub. No.: WO2022/067664
PCT Pub. Date: Apr. 7, 2022

(65) Prior Publication Data
US 2023/0308231 A1 Sep. 28, 2023

(51) Int. Cl.
*H04L 5/00* (2006.01)
*H04B 17/345* (2015.01)
(Continued)

(52) U.S. Cl.
CPC ......... *H04L 5/0035* (2013.01); *H04B 17/345* (2015.01); *H04W 72/25* (2023.01); *H04W 72/541* (2023.01)

(58) Field of Classification Search
CPC ......... H04L 5/003–0051; H04L 5/0091–0094; H04B 17/345; H04W 24/08; H04W 72/25; H04W 72/40; H04W 72/541
See application file for complete search history.

(56) References Cited

U.S. PATENT DOCUMENTS 10,499,272 B2  12/2019  Panteleev et al.
2014/0073336 A1*  3/2014  Kang .................... H04L 5/0035
                                                    455/452.1
(Continued)

FOREIGN PATENT DOCUMENTS

CN      104734753 A    6/2015
KR    20190128220 A    11/2019
(Continued)

OTHER PUBLICATIONS

International Search Report and Written Opinion—PCT/CN2020/119401—ISA/EPO—Jun. 28, 2021 (208291WO1).
(Continued)

*Primary Examiner* — Ricky Q Ngo
*Assistant Examiner* — Kabir U Jahangir
(74) *Attorney, Agent, or Firm* — QUALCOMM Incorporated

(57) ABSTRACT

Methods, systems, and devices for wireless communications are described. A user equipment (UE) with multiple transmission reception points (TRPs) (e.g., a multi-TRP UE) may receive sidelink control information including an interference measurement configuration indicating resources allocated for sidelink interference measurements across multiple TRPs. In some cases, the multi-TRP UE may decode the sidelink control information including the interference measurement configuration. The multi-TRP UE may receive one or more signals from a first UE, a second UE, or both. The multi-TRP UE may perform a sidelink interference measurement for each signal based on the interference measure-
(Continued)

ment configuration. The multi-TRP UE may determine whether to process the signals in combination or separately across TRPs based on the sidelink interference measurements.

34 Claims, 15 Drawing Sheets

(51) Int. Cl.
*H04W 72/25* (2023.01)
*H04W 72/541* (2023.01)

(56) References Cited

U.S. PATENT DOCUMENTS

| | | | |
|---|---|---|---|
| 2019/0296838 A1 | 9/2019 | Hessler et al. | |
| 2020/0021337 A1 | 1/2020 | Wang et al. | |
| 2020/0145079 A1 | 5/2020 | Marinier et al. | |
| 2022/0416969 A1* | 12/2022 | Lee | H04L 1/0026 |
| 2023/0047695 A1* | 2/2023 | Sarkis | H04B 7/0632 |
| 2023/0087003 A1* | 3/2023 | Hao | H04B 7/0632 |
| | | | 370/329 |
| 2023/0189037 A1* | 6/2023 | Matsumura | H04L 5/0035 |
| | | | 370/252 |

FOREIGN PATENT DOCUMENTS

| | | |
|---|---|---|
| WO | WO-2018128940 A2 | 7/2018 |
| WO | WO-2020033088 A1 | 2/2020 |
| WO | WO-2020146891 A1 | 7/2020 |
| WO | WO-2020173536 A1 | 9/2020 |

OTHER PUBLICATIONS

ZTE, et al., "Discussion on Measurements and RS Design for CLI Mitigation", 3GPP TSG RAN WG1 Meeting #88, 3GPP Draft, R1-1701615—8.1.6.2, Discussion on Measurement and RS Design for CCI, 3rd Generation Partnership Project (3GPP), Mobile Competence Centre; 650, Route Des Lucioles, F-06921 Sophia-Antipolis, vol. RAN WG1, No. Athens, Greece; Feb. 13, 2017-Feb. 17, 2017, Feb. 6, 2017, XP051220505, 13 Pages, the Whole Document.

Supplementary European Search Report—EP20955689—Search Authority—The Hague—May 7, 2024 (208291EP).

ZTE: "Enhancements on Multi-Beam Operation", 3GPP TSG RAN WG1 Meeting #97, R1-1906237, 3rd Generation Partnership Project, Mobile Competence Centre, 650, Route Des Lucioles, F-06921, Sophia-Antipolis Cedex, France, vol. RAN WG1, No. Reno, USA, May 13, 2019-May 17, 2019, May 4, 2019, XP051708275, 18 Pages, Section 2.1, p. 10, lines 21-24 p. 11, lines 1-35 p. 14, lines 3-35 p. 15, lines 1-15.

\* cited by examiner

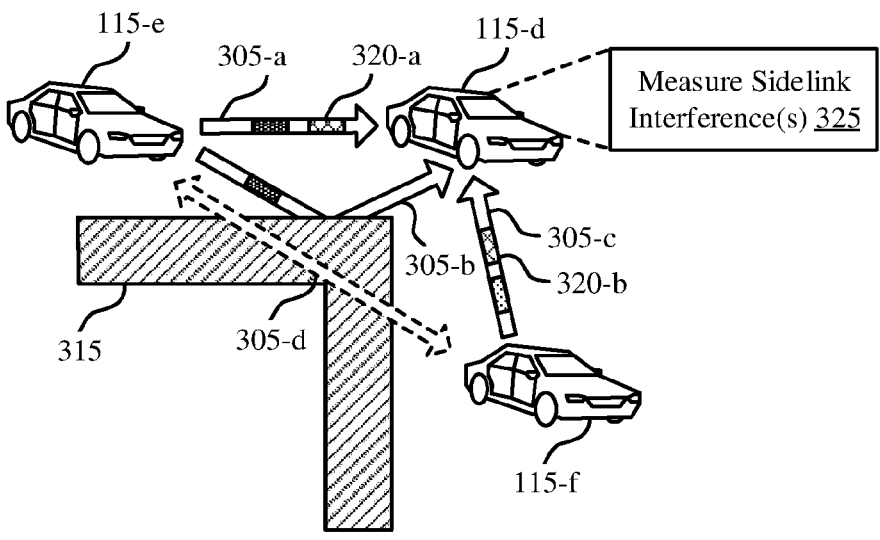
FIG. 3

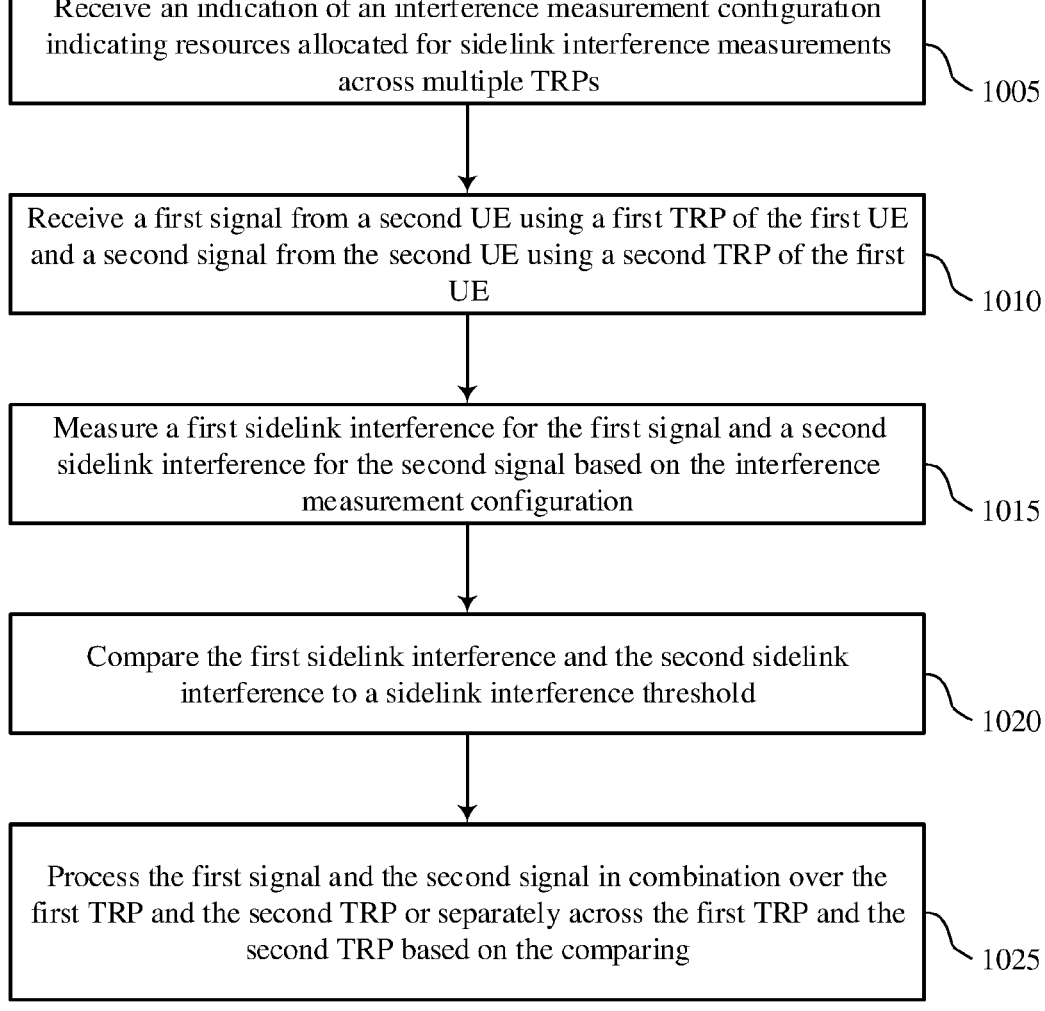

Receive an indication of an interference measurement configuration indicating resources allocated for sidelink interference measurements across multiple TRPs

1005

Receive a first signal from a second UE using a first TRP of the first UE and a second signal from the second UE using a second TRP of the first UE

1010

Measure a first sidelink interference for the first signal and a second sidelink interference for the second signal based on the interference measurement configuration

1015

Compare the first sidelink interference and the second sidelink interference to a sidelink interference threshold

1020

Process the first signal and the second signal in combination over the first TRP and the second TRP or separately across the first TRP and the second TRP based on the comparing

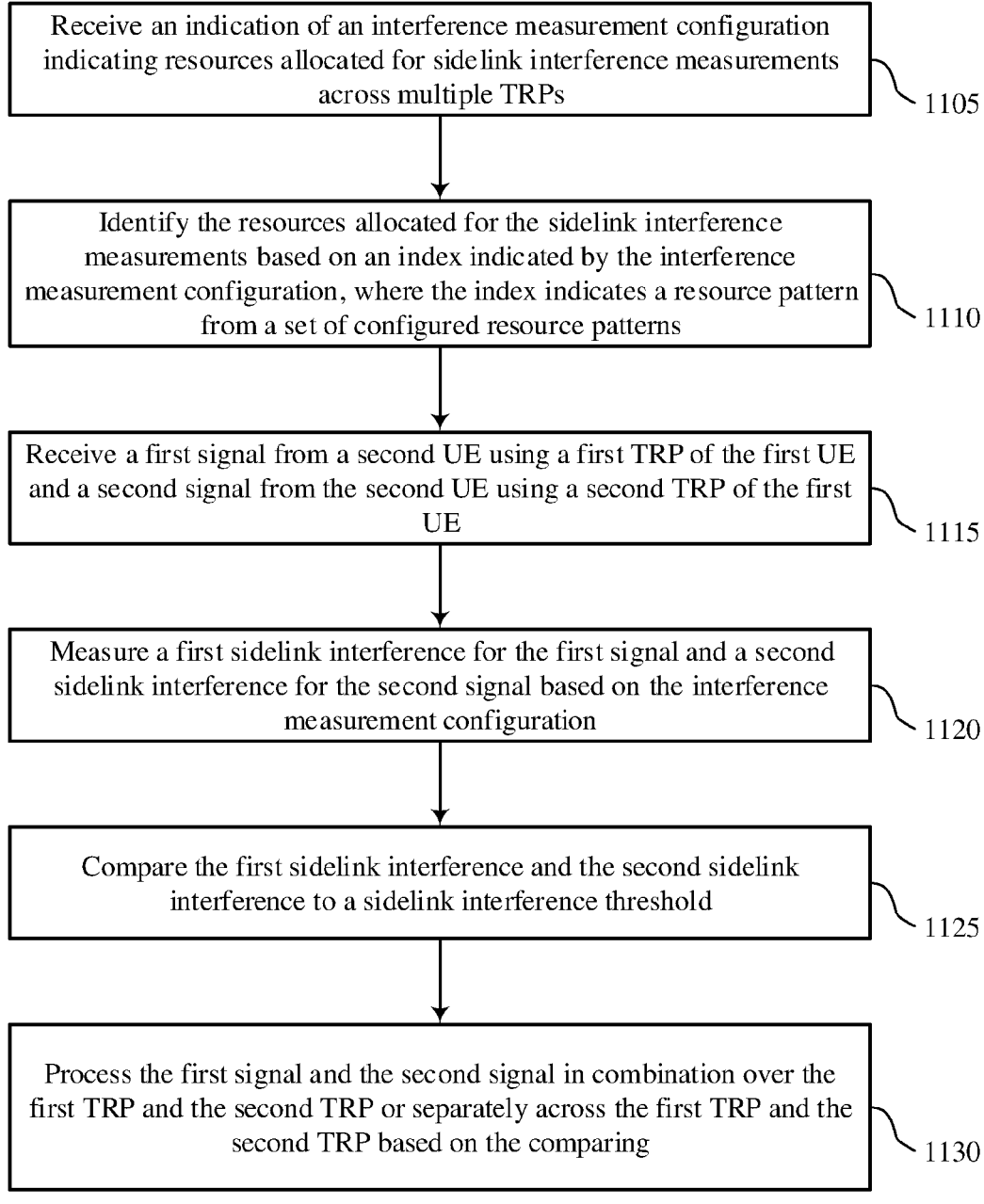

Receive an indication of an interference measurement configuration
indicating resources allocated for sidelink interference measurements
across multiple TRPs

1105

Identify the resources allocated for the sidelink interference
measurements based on an index indicated by the interference
measurement configuration, where the index indicates a resource pattern
from a set of configured resource patterns

1110

Receive a first signal from a second UE using a first TRP of the first UE
and a second signal from the second UE using a second TRP of the first
UE

1115

Measure a first sidelink interference for the first signal and a second
sidelink interference for the second signal based on the interference
measurement configuration

1120

Compare the first sidelink interference and the second sidelink
interference to a sidelink interference threshold

1125

Process the first signal and the second signal in combination over the
first TRP and the second TRP or separately across the first TRP and the
second TRP based on the comparing

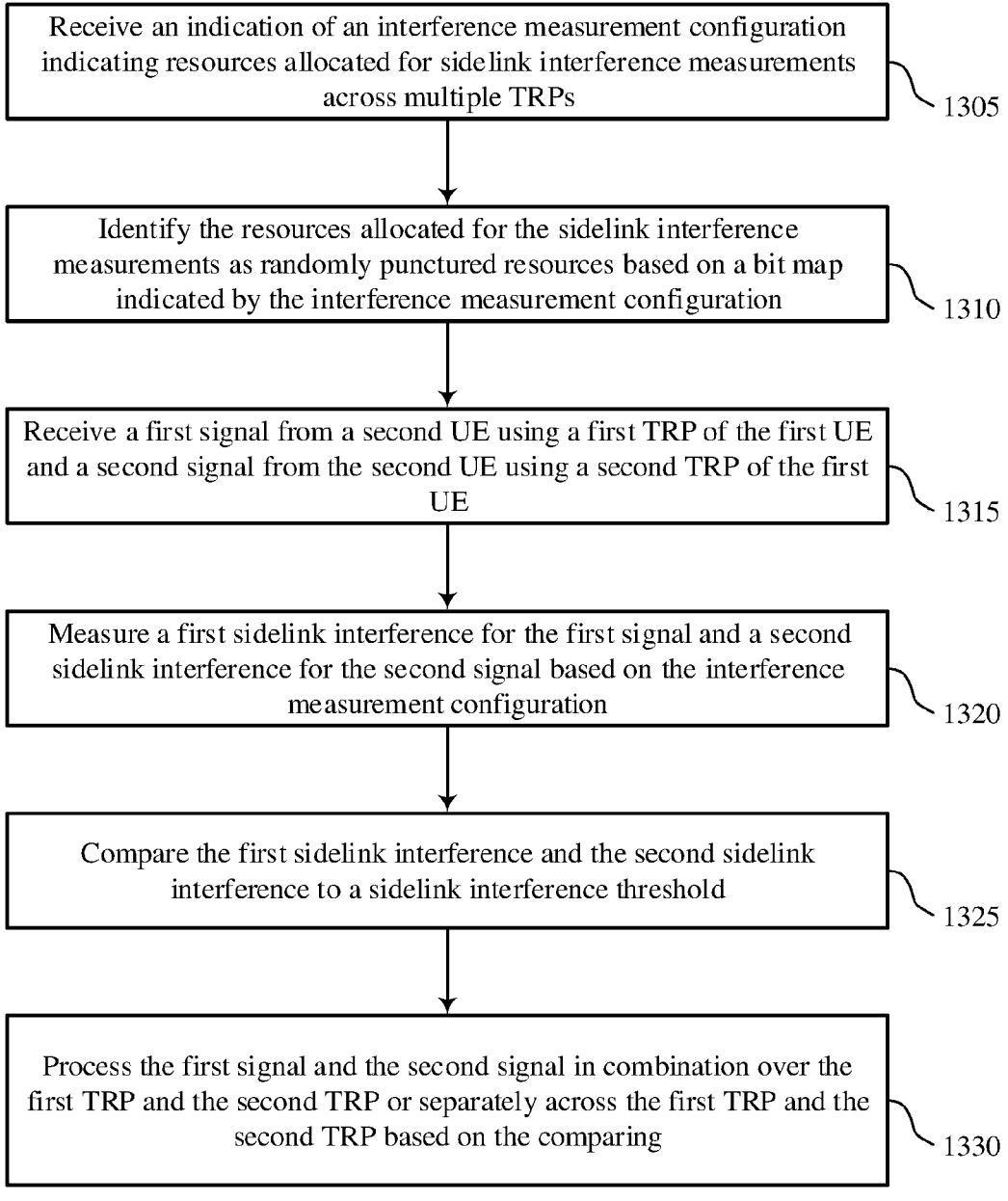

Receive an indication of an interference measurement configuration indicating resources allocated for sidelink interference measurements across multiple TRPs
1305

Identify the resources allocated for the sidelink interference measurements as randomly punctured resources based on a bit map indicated by the interference measurement configuration
1310

Receive a first signal from a second UE using a first TRP of the first UE and a second signal from the second UE using a second TRP of the first UE
1315

Measure a first sidelink interference for the first signal and a second sidelink interference for the second signal based on the interference measurement configuration
1320

Compare the first sidelink interference and the second sidelink interference to a sidelink interference threshold
1325

Process the first signal and the second signal in combination over the first TRP and the second TRP or separately across the first TRP and the second TRP based on the comparing
1330

Configure resources allocated for sidelink interference measurements across multiple TRPs

1405

Determine an interference measurement configuration for indicating the configured resources allocated for the sidelink interference measurements across multiple TRPs

1410

Transmit an indication of the interference measurement configuration

1415

1400

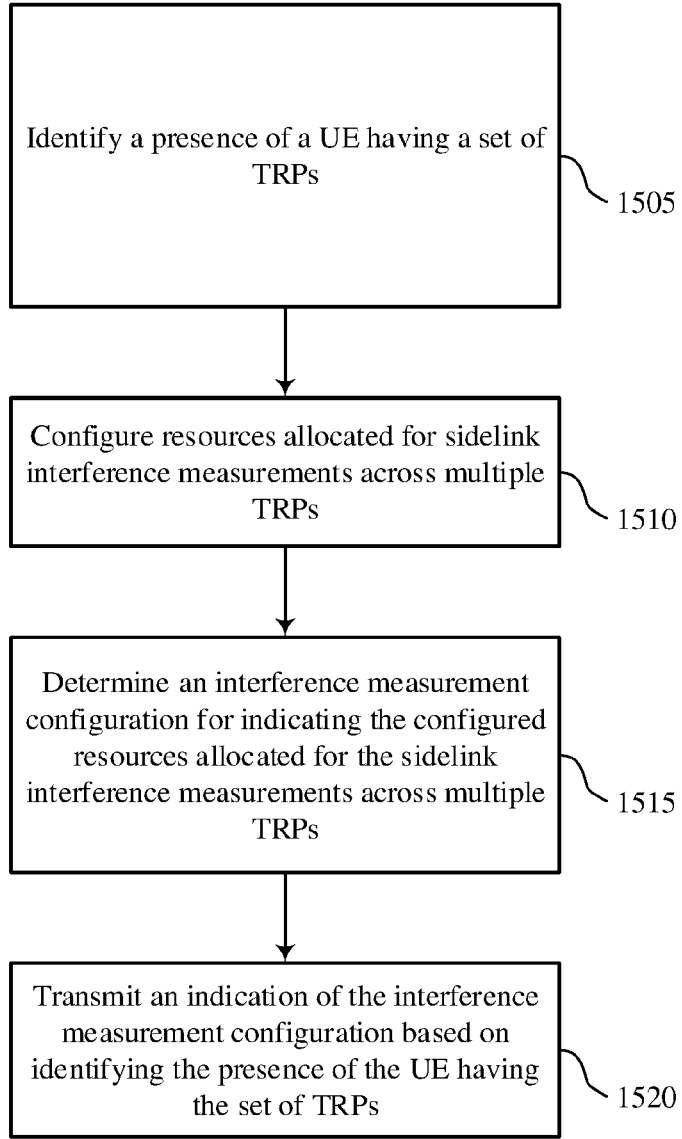

Identify a presence of a UE having a set of TRPs

1505

Configure resources allocated for sidelink interference measurements across multiple TRPs

1510

Determine an interference measurement configuration for indicating the configured resources allocated for the sidelink interference measurements across multiple TRPs

1515

Transmit an indication of the interference measurement configuration based on identifying the presence of the UE having the set of TRPs

SIDELINK RECEPTION WITH MULTIPLE TRANSMISSION RECEPTION POINTS

CROSS REFERENCE

The present Application is a 371 national stage filing of International PCT Application No. PCT/CN2020/119401 by Dutta et al. entitled "SIDELINK RECEPTION WITH MULTIPLE TRANSMISSION RECEPTION POINTS," filed Sep. 30, 2020, which is assigned to the assignee hereof, and which is expressly incorporated by reference in its entirety herein.

FIELD OF TECHNOLOGY

The following relates to wireless communications, including sidelink reception with multiple transmission reception points (TRPs).

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

The described techniques relate to improved methods, systems, devices, and apparatuses that support sidelink reception with multiple transmission reception points (TRPs). Generally, the described techniques provide for a user equipment (UE) with multiple TRPs (e.g., a multi-TRP UE) to perform sidelink interference measurements on one or more signals to determine whether to process the signals in combination or separately. For example, the multi-TRP UE may receive sidelink control information including an interference measurement configuration indicating resources allocated for sidelink interference measurements across multiple TRPs. In some cases, the multi-TRP UE may decode the sidelink control information including the interference measurement configuration. Subsequently, the multi-TRP UE may receive one or more signals from a first UE, a second UE, or both. The multi-TRP UE may perform a sidelink interference measurement for each signal based on the interference measurement configuration. In some cases, the multi-TRP UE may determine whether to process the signals in combination or separately across TRPs based on the sidelink interference measurements.

A method of wireless communications at a first UE is described. The method may include receiving an indication of an interference measurement configuration indicating resources allocated for sidelink interference measurements across multiple TRPs, receiving a first signal from a second UE using a first TRP of the first UE and a second signal from the second UE using a second TRP of the first UE, measuring a first sidelink interference for the first signal and a second sidelink interference for the second signal based on the interference measurement configuration, comparing the first sidelink interference and the second sidelink interference to a sidelink interference threshold, and processing the first signal and the second signal in combination over the first TRP and the second TRP or separately across the first TRP and the second TRP based on the comparing.

An apparatus for wireless communications at a first UE is described. The apparatus may include a processor, memory coupled with the processor, and instructions stored in the memory. The instructions may be executable by the processor to cause the apparatus to receive an indication of an interference measurement configuration indicating resources allocated for sidelink interference measurements across multiple TRPs, receive a first signal from a second UE using a first TRP of the first UE and a second signal from the second UE using a second TRP of the first UE, measure a first sidelink interference for the first signal and a second sidelink interference for the second signal based on the interference measurement configuration, compare the first sidelink interference and the second sidelink interference to a sidelink interference threshold, and process the first signal and the second signal in combination over the first TRP and the second TRP or separately across the first TRP and the second TRP based on the comparing.

Another apparatus for wireless communications at a first UE is described. The apparatus may include means for receiving an indication of an interference measurement configuration indicating resources allocated for sidelink interference measurements across multiple TRPs, receiving a first signal from a second UE using a first TRP of the first UE and a second signal from the second UE using a second TRP of the first UE, measuring a first sidelink interference for the first signal and a second sidelink interference for the second signal based on the interference measurement configuration, comparing the first sidelink interference and the second sidelink interference to a sidelink interference threshold, and processing the first signal and the second signal in combination over the first TRP and the second TRP or separately across the first TRP and the second TRP based on the comparing.

A non-transitory computer-readable medium storing code for wireless communications at a first UE is described. The code may include instructions executable by a processor to receive an indication of an interference measurement configuration indicating resources allocated for sidelink interference measurements across multiple TRPs, receive a first signal from a second UE using a first TRP of the first UE and a second signal from the second UE using a second TRP of the first UE, measure a first sidelink interference for the first signal and a second sidelink interference for the second signal based on the interference measurement configuration, compare the first sidelink interference and the second sidelink interference to a sidelink interference threshold, and process the first signal and the second signal in combination over the first TRP and the second TRP or separately across the first TRP and the second TRP based on the comparing.

Some examples of the method, apparatuses, and non-transitory computer-readable medium described herein may further include operations, features, means, or instructions for identifying the resources allocated for the sidelink interference measurements based on an index indicated by the interference measurement configuration, where the index indicates a resource pattern from a set of configured resource patterns.

Some examples of the method, apparatuses, and non-transitory computer-readable medium described herein may further include operations, features, means, or instructions for determining the resources allocated for the sidelink interference measurements based on a formula, where the interference measurement configuration indicates that the resources allocated for the sidelink interference measurements may have been allocated.

Some examples of the method, apparatuses, and non-transitory computer-readable medium described herein may further include operations, features, means, or instructions for identifying the resources allocated for the sidelink interference measurements as randomly punctured resources based on a bit map indicated by the interference measurement configuration.

In some examples of the method, apparatuses, and non-transitory computer-readable medium described herein, measuring the first sidelink interference and the second sidelink interference may include operations, features, means, or instructions for receiving sidelink control information from the second UE, the sidelink control information including the interference measurement configuration, and measuring received signal strength of the first signal and the second signal over the resources allocated for the sidelink interference measurements.

In some examples of the method, apparatuses, and non-transitory computer-readable medium described herein, processing the first signal and the second signal may include operations, features, means, or instructions for determining the first sidelink interference and the second sidelink interference may be less than or equal to the sidelink interference threshold, and decoding the first signal and the second signal in combination over the first TRP and the second TRP based on determining the first sidelink interference and the second sidelink interference may be less than or equal to the sidelink interference threshold.

Some examples of the method, apparatuses, and non-transitory computer-readable medium described herein may further include operations, features, means, or instructions for measuring the first sidelink interference and the second sidelink interference based on an energy per resource element (EPRE), a received signal strength indicator (RSSI), or both corresponding to the first signal and the second signal.

In some examples of the method, apparatuses, and non-transitory computer-readable medium described herein, the first signal and the second signal are associated with a broadcast transmission, a multicast transmission, or any combination.

In some examples of the method, apparatuses, and non-transitory computer-readable medium described herein, processing the first signal and the second signal may include operations, features, means, or instructions for determining the first sidelink interference or the second sidelink interference may be greater than the sidelink interference threshold, and decoding the first signal and the second signal separately across the first TRP and the second TRP based on determining the first sidelink interference or the second sidelink interference may be greater than the sidelink interference threshold.

Some examples of the method, apparatuses, and non-transitory computer-readable medium described herein may further include operations, features, means, or instructions for performing an interference cancelation operation based on the first sidelink interference and the second sidelink interference.

In some examples of the method, apparatuses, and non-transitory computer-readable medium described herein, the interference cancelation operation may include operations, features, means, or instructions for determining one or more reference signals associated with the first signal may be non-orthogonal to one or more reference signals associated with the second signal, and offsetting a non-orthogonality between the one or more reference signals associated with the first signal and the one or more reference signals associated with the second signal, where the offsetting may be based on the first sidelink interference and the second sidelink interference.

A method of wireless communications at a UE is described. The method may include configuring resources allocated for sidelink interference measurements across multiple TRPs, determining an interference measurement configuration for indicating the configured resources allocated for the sidelink interference measurements across multiple TRPs, and transmitting an indication of the interference measurement configuration.

An apparatus for wireless communications at a UE is described. The apparatus may include a processor, memory coupled with the processor, and instructions stored in the memory. The instructions may be executable by the processor to cause the apparatus to configure resources allocated for sidelink interference measurements across multiple TRPs, determine an interference measurement configuration for indicating the configured resources allocated for the sidelink interference measurements across multiple TRPs, and transmit an indication of the interference measurement configuration.

Another apparatus for wireless communications at a UE is described. The apparatus may include means for configuring resources allocated for sidelink interference measurements across multiple TRPs, determining an interference measurement configuration for indicating the configured resources allocated for the sidelink interference measurements across multiple TRPs, and transmitting an indication of the interference measurement configuration.

A non-transitory computer-readable medium storing code for wireless communications at a UE is described. The code may include instructions executable by a processor to configure resources allocated for sidelink interference measurements across multiple TRPs, determine an interference measurement configuration for indicating the configured resources allocated for the sidelink interference measurements across multiple TRPs, and transmit an indication of the interference measurement configuration.

In some examples of the method, apparatuses, and non-transitory computer-readable medium described herein, determining the interference measurement configuration may include operations, features, means, or instructions for selecting a resource pattern from a set of configured resource patterns, where the interference measurement configuration includes an index indicating the selected resource pattern.

In some examples of the method, apparatuses, and non-transitory computer-readable medium described herein, determining the interference measurement configuration may include operations, features, means, or instructions for determining the configured resources allocated for the sidelink interference measurements based on a formula, where the interference measurement configuration indicates that the configured resources allocated for the sidelink interference measurements may have been allocated.

In some examples of the method, apparatuses, and non-transitory computer-readable medium described herein, determining the interference measurement configuration may include operations, features, means, or instructions for puncturing one or more resource elements with the configured resources allocated for sidelink measurements, where the interference measurement configuration includes a bit map indicating the configured resources allocated for sidelink measurements.

Some examples of the method, apparatuses, and non-transitory computer-readable medium described herein may further include operations, features, means, or instructions for determining a level of network congestion exceeds a congestion threshold, where transmitting the indication of the interference measurement configuration may be based on determining the level of network congestion exceeds the congestion threshold.

Some examples of the method, apparatuses, and non-transitory computer-readable medium described herein may further include operations, features, means, or instructions for identifying a presence of a UE having a set of TRPs, where transmitting the indication of the interference measurement configuration may be based on identifying the presence of the UE having the set of TRPs.

In some examples of the method, apparatuses, and non-transitory computer-readable medium described herein, identifying the presence of the UE having the set of TRPs may include operations, features, means, or instructions for receiving control signaling indicating a capability of the UE having the set of TRPs.

In some examples of the method, apparatuses, and non-transitory computer-readable medium described herein, identifying the presence of the UE having the set of TRPs may include operations, features, means, or instructions for receiving control signaling including an indication of additional resources allocated for the sidelink interference measurements.

In some examples of the method, apparatuses, and non-transitory computer-readable medium described herein, the configured resources allocated for the sidelink interference measurements include zero-power interference measurement resources (IMRs).

BRIEF DESCRIPTION OF THE DRAWINGS

FIGS. 1 through 3 illustrate examples of wireless communications systems that support sidelink reception with multiple transmission reception points (TRPs) in accordance with aspects of the present disclosure.

FIGS. 10 through 15 show flowcharts illustrating methods that support sidelink reception with multiple TRPs in accordance with aspects of the present disclosure.

DETAILED DESCRIPTION

Figure 1:
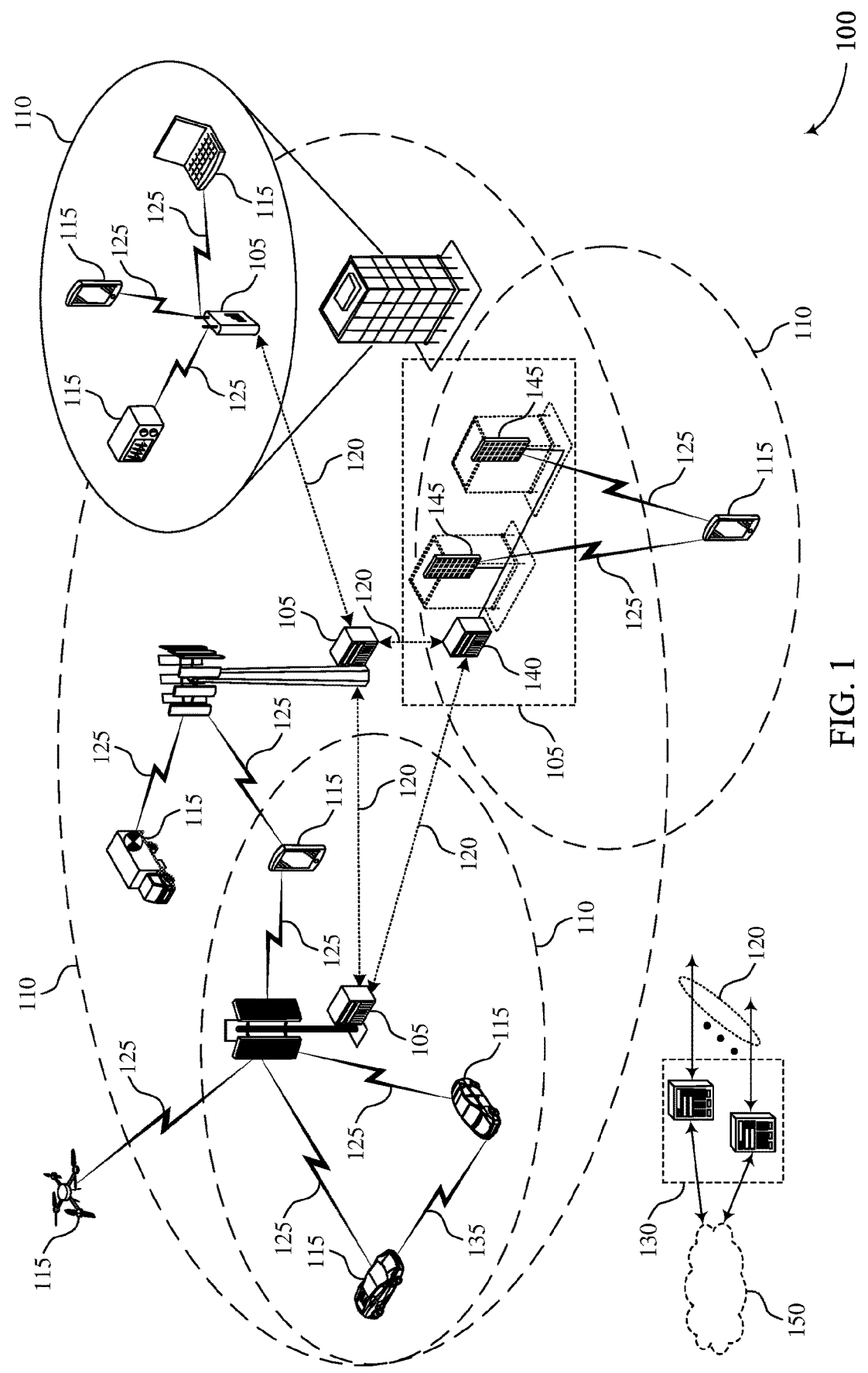

Some wireless communications systems, such as fifth generation (5G) systems which may be referred to as New Radio (NR) systems, may support sidelink communications. A sidelink may refer to a communication link between similar devices, such as user equipment (UE), relay, or end devices, among other examples of devices. For example, a sidelink may support communications between multiple UEs (e.g., in a vehicle-to-everything (V2X) system, a vehicle-to-vehicle (V2V) system, a device-to-device (D2D) system, among other examples), between multiple base stations (e.g., in an integrated access and backhaul (IAB) deployment), or between other types of wireless communications devices. It is noted that while various examples provided herein are discussed for UE sidelink devices, such sidelink techniques may be used for any type of wireless devices that use sidelink communications. For example, a sidelink may support one or more of D2D communications, V2X or V2V communications, message relaying, discovery signaling, beacon signaling, or other signals transmitted over-the-air from one wireless device to one or more other similar wireless devices.

In some examples, a UE capable of sidelink communications may have multiple transmission reception points (TRPs) and may be referred to as a multi-TRP UE. For example, the multi-TRP UE may be capable of receiving signals from one or more UEs on multiple TRPs, which may be located at different positions at the multi-TRP UE. In some cases, each TRP may have a different received signal power. The multi-TRP UE may receive signals from a first UE and a second UE, which may not be visible to each other due to a blockage. In some cases, the multi-TRP UE may receive a first signal and a second signal that originate from a same UE (e.g., the first signal is a line-of-sight reception and the second signal is from a reflection). Transmissions from the first UE and the second UE may include non-orthogonal reference signals or interference management resources (IMRs) or may otherwise interfere with other signals being received by the multi-TRP UE. The multi-TRP UE may have the ability to either combine the signals across the TRPs or process the signals separately. However, the multi-TRP UE may not have sufficient information to determine whether to process the signals in combination or separately, which may result in relatively poor channel estimation at the multi-TRP UE (e.g., a noisy channel may lead to improper equalization and decoding failure).

As described herein, a multi-TRP UE may measure sidelink interference from one or more signals (e.g., from a first UE and/or a second UE) and determine whether to combine the signals based on an interference threshold. In some cases, the multi-TRP UE may receive the signals on multiple TRPs, which may be located at different positions at the multi-TRP UE. The multi-TRP UE may measure a sidelink interference for each signal based on receiving an interference measurement configuration. The sidelink interference may be based on one or more IMRs allocated in the interference measurement configuration. In some cases, the multi-TRP UE may determine whether the sidelink interference measurement for each signal is less than or equal to the interference threshold. If one or more of the sidelink interference measurements is greater than the interference threshold, the multi-TRP UE may determine not to combine the signals. Otherwise, if each sidelink interference measurement is below the threshold, the multi-TRP UE may combine the signals. In some cases, the multi-TRP may have more than two TRPs, and may combine signals over a subset of the TRPs if the sidelink interference measurement is below the threshold for each of the TRPs in the subset. In some cases, the multi-TRP UE may perform an interference cancellation procedure based on determining not to combine the signals.

A UE may configure IMRs and transmit a configuration to a multi-TRP UE based on one or more triggers. For example, a UE may identify the presence of a multi-TRP UE (e.g., based on communicating with the multi-TRP or based on other evidence of a multi-TRP being nearby), may determine the communication network is highly congested, or both. The UE may transmit the interference measurement configuration indicating resources allocated for one or more sidelink interference measurements in a sidelink control information message based on communicating with a multi-TRP UE, determining the communication network is highly congested, or both.

Aspects of the disclosure are initially described in the context of wireless communications systems. Aspects of the disclosure are further described in the context of process flows. Aspects of the disclosure are further illustrated by and described with reference to apparatus diagrams, system diagrams, and flowcharts that relate to sidelink reception with multiple TRPs.

FIG. 1 illustrates an example of a wireless communications system 100 that supports sidelink reception with multiple TRPs in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples, the wireless communications system 100 may support sidelink communications (e.g., communications within a group of UEs 115). For example, the wireless communications system 100 may be an example of, or include aspects of, a V2X communications system (e.g., a UE 115 may be an example of a vehicle, a vulnerable road user (VRU), or other wireless devices). In some examples, a UE 115 may include one or more TRPs. For example, a UE 115 may be an example of a vehicle with a single TRP or a UE 115 may be an example of a vehicle with multiple TRPs (e.g., two TRPs located at the front and the rear of the vehicle, although any quantity or location of TRPs may be used).

In some cases, a multi-TRP UE 115 may receive one or more signals from a first UE 115, a second UE 115, or both, which may not be visible to each other due to an obstruction. Thus, transmissions from the first UE 115 and the second UE 115 may include non-orthogonal reference signals or IMRs. In some examples, the multi-TRP UE 115 may have the ability to either combine the signals across the TRPs or process the signals separately. However, the multi-TRP UE 115 may not have sufficient information to determine whether to process the signals in combination or separately, which may result in relatively poor channel estimation at the multi-TRP UE 115 (e.g., a noisy channel may lead to improper equalization and decoding failure).

In some examples, a multi-TRP UE 115 may perform sidelink interference measurements on one or more signals to determine whether to process the signals in combination or separately. For example, the multi-TRP UE 115 may receive sidelink control information including an interference measurement configuration indicating resources allocated for sidelink interference measurements across multiple TRPs. For example, the sidelink control information may include an indication of zero-power IMRs. In some cases, the multi-TRP UE 115 may decode the sidelink control information including the interference measurement configuration. Subsequently, the multi-TRP UE 115 may receive one or more signals from a first UE 115, a second UE 115, or both. The multi-TRP UE 115 may perform a sidelink interference measurement for each signal based on the interference measurement configuration (e.g., over the resources).

In some cases, the multi-TRP UE 115 may determine whether to process the signals in combination or separately across TRPs based on the sidelink interference measurements. For example, the multi-TRP UE 115 may combine the signals based on the sidelink interference measurement for each signal having a value less than or equal to a threshold interference. In some other examples, the multi-TRP UE 115 may process the signals separately based on at least one sidelink interference measurement having a value greater than a threshold interference.

Figure 2:
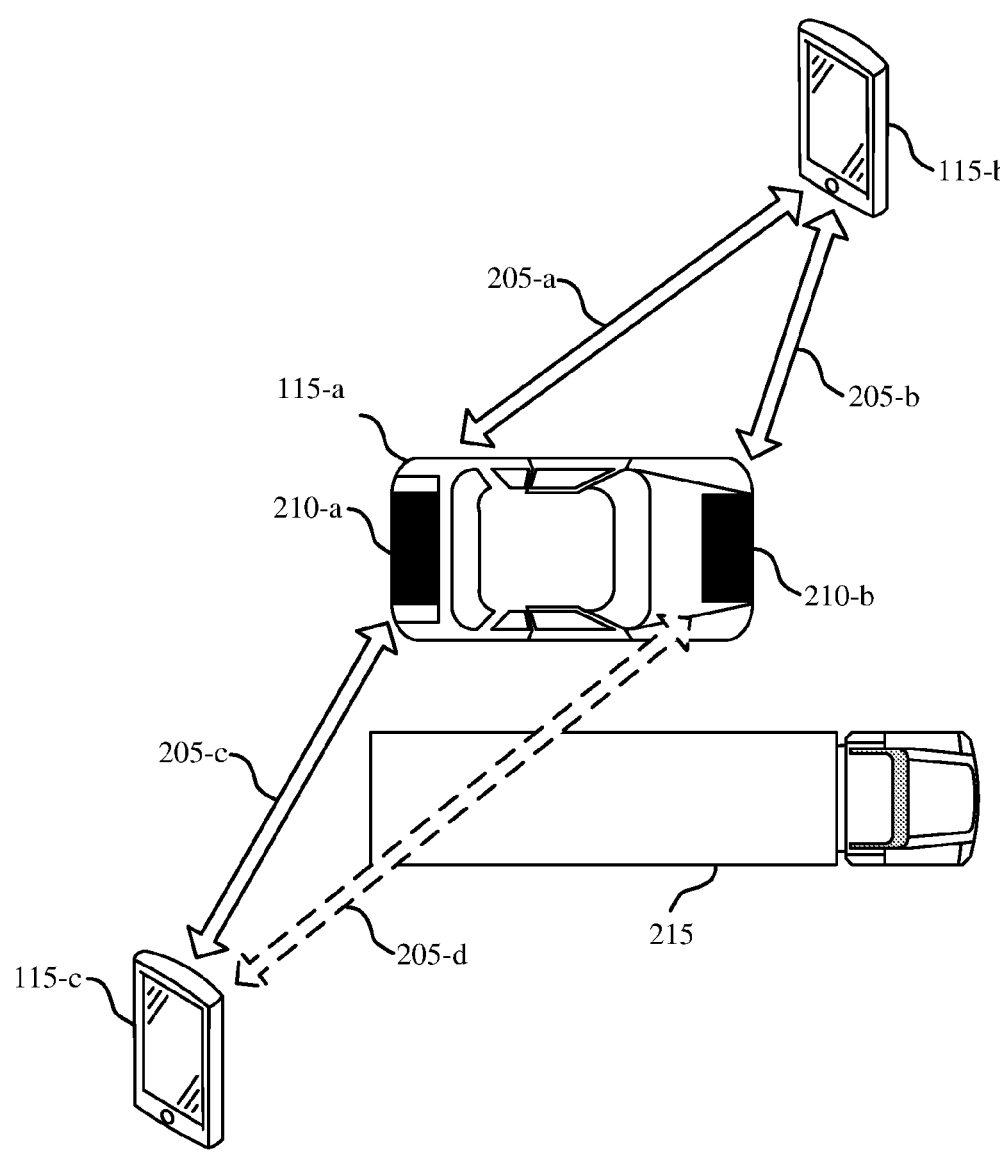

FIG. 2 illustrates an example of a wireless communications system 200 that supports sidelink reception with multiple TRPs in accordance with aspects of the present disclosure. In some examples, wireless communications system 200 may implement aspects of wireless communications system 100 and may include UE 115-*a* through UE 115-*c*, which may be examples of UEs 115 as described with reference to FIG. 1. For example, the UEs 115 may be examples of wireless devices (e.g., vehicles, mobile devices, VRUs, etc.) and may communicate using sidelink communication links 205. In some examples, a UE 115, such as UE 115-*a*, may measure sidelink interference from one or more signals (e.g., from UE 115-*b* through UE 115-*e*) and may determine whether to combine the signals based on an interference threshold.

In some cases, UE 115-*a* may be an example of a multi-TRP UE 115. That is, UE 115-*a* may include a first TRP 210-*a* and a second TRP 210-*b*, although it is to be understood that any quantity of TRPs 210 may be implemented by a UE 115 (e.g., a larger vehicle such as a truck or trailer may have relatively more TRPs 210). A TRP 210 may be configured to receive and transmit signals. TRP 210-*a* and TRP 210-*b* may be configured to transmit signals in conjunction with one another, individually (e.g., separately from one another), or both. In some cases, a multi-TRP UE 115, such as UE 115-*a*, may receive signals directionally, which may allow spatial division multiplexing (SDM) for broadcast signals, groupcast signals, unicast signals, or a combination.

Such TRPs 210 may include, but are not limited to, antennas, antenna panels, and the like. For example, TRP 210-*a* and TRP 210-*b* may include different radio frequency modules with a shared hardware controller, software controller, or both. In some cases, in a first multi-TRP UE 115, a first TRP 210 and a second TRP 210 may exhibit separate radio frequency (RF) modules and separate baseband components, but may share common processing in the physical layer, MAC layer, RLC layer, PDCP layer, RRC layer, or any combination thereof. In some other cases, in a second multi-TRP UE 115, a first TRP 210 and a second TRP 210 may exhibit separate RF modules, separate baseband components, and separate processing in the physical layer, MAC layer, RLC layer, PDCP layer, or any combination thereof, such that the first TRP and the second TRP share common processing resources in the RRC layer.

In some cases, the TRPs 210 of UE 115-*a* may be positioned relatively close to one another. In some other cases, the TRPs 210 of UE 115-*a* may be physically separated from each other by some distance. For example, in the context of a vehicle, TRP 210-*a* may be positioned at or near the rear of the vehicle, while TRP 210-*b* may be positioned at or near the front of the vehicle. In this example, TRP 210-*a* (e.g., a first antenna panel) and TRP 210-*b* (e.g., a second antenna panel) may be separated from one another by several meters. This physical separation may be even larger in the case of larger UEs 115, such as semi-trucks, where multiple TRPs 210 may be physically separated from one another by twenty meters or more.

Due to the separate components, physical position, and physical separation between TRP 210-*a* and TRP 210-*b*, each of the respective TRPs 210 may view a channel differently. For example, TRP 210-*a* may receive signals from UE 115-*b* via sidelink communications link 205-*a*, and TRP 210-*b* may receive signals from UE 115-*b* via sidelink communications link 205-*b*. The signals received at TRP 210-*a* may travel a greater distance than the signals received at TRP 210-*b*. The varying propagation distances may result in varying parameters (e.g., characteristics) associated with the signals received by the respective TRPs 210. For example, due to the differences in propagation distances, the signals received at TRP 210-*a* may exhibit a lower signal quality (e.g., lower received signal strength indicator (RSSI), lower reference signal received power (RSRP), lower reference signal received quality (RSRQ), higher SNR, higher SINR) as compared to the signals received at TRP 210-*b*. Moreover, the signals received at TRP 210-*a* may be received later in time than the signals received at TRP 210-*b*. These differences in signal parameters (e.g., RSRP, RSRQ, SNR, SINR, time of receipt) may result despite the fact that the respective signals were transmitted by UE 115-*b* at the same time and with the same transmit power.

Physical obstructions, weather conditions, noise, line of sight (LoS) vs. non-line of sight (NLoS), and other conditions may further increase differences between signals transmitted by the respective TRPs 210, received at the respective TRPs, or both. For example, UE 115-*c* may transmit signals to TRP 210-*a* via sidelink communications link 205-*c*, and may transmit signals to TRP 210-*b* via sidelink communications link 205-*d*. In this example, the signals may be effectively received by TRP 210-*a*. However, the signals transmitted to TRP 210-*b* may be deflected, blocked, or otherwise interfered with by an obstruction 215, such as a truck. In this example, the signals may not be received from UE 115-*c* at TRP 210-*b* because sidelink communications link 205-*d* may be blocked due to the obstruction 215. Additionally or alternatively, signals which are received at TRP 210-*b* may suffer from low signal quality as compared to the signals received by TRP 210-*a*.

Additionally or alternatively, communications in the wireless communications system 200 may result in interference. For example, multiple UEs 115 may send transmissions via overlapping time frequency resources, which may result in collisions between the transmissions and reduced signal quality for communications. As an illustrative example, UE 115-*b* and UE 115-*c* may send overlapping transmissions to UE 115-*a*. For example communications sent on link 205-*a* may interfere with communications sent on link 205-*c* resulting in interference at TRP 210-*a*. The UE 115-*a* may be unable to successfully decode the transmissions. For example, the transmissions may include non-orthogonal reference signals (e.g., demodulation reference signals (DMRSs), channel state information (CSI) reference signal (RS), etc.) or may use the same interference management resources, which may result in relatively poor channel estimation (e.g., a noisy channel may lead to improper equalization and decoding failure at the UE 115-*a*).

In some cases, UE 115-*a* may receive an indication of an interference measurement configuration (e.g., from UE 115-*b*, UE 115-*c*, or both) indicating resources allocated for sidelink interference measurements, such as one or more IMRs. UE 115-*a* may receive one or more signals, such as broadcast signals, multicast signals, or both, from UE 115-*b*, UE 115-*c*, or both using TRP 210-*a* and TRP 210-*b*. In some examples, UE 115-*a* may measure sidelink interference for the one or more signals over the IMRs. In some examples, UE 115-*a* may compare the sidelink interference measurement for each signal to a threshold interference. If at least one of the sidelink interference measurements is greater than the interference threshold, UE 115-*a* may decode the signals separately across TRP 210-*a* and TRP 210-*b*. If the sidelink interference measurements are less than or equal to the interference threshold, UE 115-*a* may decode the signals in combination over TRP 210-*a* and TRP 210-*b*.

FIG. 3 illustrates an example of a wireless communications system 300 that supports sidelink reception with multiple TRPs in accordance with aspects of the present disclosure. In some examples, wireless communications system 300 may implement aspects of wireless communications system 100, wireless communications system 200, or both and may include UE 115-*d* through UE 115-*f*, which may be examples of UEs 115 as described with reference to FIGS. 1 and 2. For example, the UEs 115 may be examples of wireless devices (e.g., vehicles, mobile devices, VRUs, etc.) and may communicate using sidelink communication links 305. For example, UE 115-*e* and UE 115-*f* may transmit sidelink signaling (e.g., sidelink control information or data) to UE 115-*d* via sidelink communication link 305-*a* and through sidelink communication link 305-*c*. In some examples, a UE 115, such as UE 115-*d*, may measure sidelink interference from one or more signals (e.g., from UE 115-*e* and/or UE 115-*f*) and may determine whether to combine the signals based on an interference threshold.

In some cases, UE 115-*d* may be an example of a multi-TRP UE 115. For example, UE 115-*d* may have multiple TRPs used for transmitting and receiving signals 310 (e.g., broadcast signals, multicast signals, or both), as described with reference to FIG. 2. In some cases, UE 115-*d* may receive one or more signals 310 from UE 115-*e*, UE 115-*f*, or both, which may not be visible to each other due to an obstruction 315 that blocks sidelink communication link 305-*d*. Thus, transmissions from UE 115-*e* and UE 115-*f* may include non-orthogonal reference signals or IMRs or may otherwise result in interference at UE 115-*d*. In some examples, UE 115-*d* may have the ability to either combine the signals 310 across the TRPs or process the signals 310 separately. However, a multi-TRP UE 115 may not have sufficient information to determine whether to process the signals 310 in combination or separately, which may result in relatively poor channel estimation at the multi-TRP UE 115 (e.g., a noisy channel may lead to improper equalization and decoding failure).

In some examples, UE 115-*d* may receive signal 310-*a* from UE 115-*e* over a LoS sidelink communication link 305-*a* and sidelink communication link 305-*b* and signal 310-*b* from UE 115-*f* over an LoS sidelink communication link 305-*c*. UE 115-*d* may use a TRP on the rear panel to receive signal 310-*a* over sidelink communication link 305-*a* and may use a TRP on the front panel to receive signal 310-*a* over sidelink communication link 305-*b* and signal 310-*b* over sidelink communication link 305-*c*. Processing signal 310-*a* received over sidelink communication link 305-*a* and sidelink communication link 305-*b* in combination may degrade the performance at UE 115-*d* by increasing the chance of pilot contamination and decode failure (e.g., because there is a 25% probability that the DMRS patterns are non-orthogonal). Thus, it may be beneficial for UE 115-*d* to determine whether to decode a signal 310 with or without combining the signal 310 over one or more TRPs (e.g., over a subset of TRPs in a case of more than two TRPs).

In some cases, such as for connection-less services (e.g., when dedicated communication links are not established between UEs 115), a multi-TRP UE 115 may perform sidelink interference measurements on one or more signals 310 to determine whether to process the signals 310 in combination or separately. For example, UE 115-*d* may receive sidelink control information 320 from UE 115-*e*, UE 115-*f*, or both. The sidelink control information 320 may include an interference measurement configuration indicating resources allocated for sidelink interference measurements across multiple TRPs. For example, the sidelink control information 320 may include an indication of zero-power IMRs. The interference measurement configuration may be transmitted in a sidelink control channel, a sidelink shared channel, or both. In some cases, UE 115-*d* may receive sidelink control information 320-*a* from UE 115-*e* over sidelink communication link 305-*a*, sidelink control information 320-*b* from UE 115-*f* over sidelink communication link 305-*c*, or both. In some examples, a UE 115 may transmit the sidelink control information 320 via a LoS sidelink communication link 305, a NLoS sidelink communication link 305, or both.

In some examples, the interference measurement configuration may include an index for a resource pattern (e.g., an IMR pattern) of a set of configured resource patterns. UE 115-*d* may determine which IMRs to use based on the resource pattern for the index. In some other examples, UE 115-*d* may determine a resource pattern based on a formula, or one or more numerical operations. For example, UE 115-*d* may determine one or more IMRs to use based on a UE identifier of the transmitting UE 115 (e.g., UE 115-*e*, UE 115-*f*, or both), a cast type (e.g., broadcast, multicast, etc.), one or more selected resources, or the like. The transmitting UE 115 may indicate an IMR transmission by including a one bit indicator in the sidelink control information 320. The resource pattern may specify one or more resources that may correspond to orthogonal reference signals for multiple UEs 115.

In some cases, UE 115-*d* may determine resources for the sidelink interference measurements based on randomly punctured resources. For example, the transmitting UE 115 may randomly puncture a number of resource elements and indicate the resource elements in the sidelink control information 320 (e.g., as a bit map). In some cases, a subchannel may have a number of resource blocks, such as 10 resource blocks. The transmitting UE 115 may include a number of resource blocks across symbols (e.g., 2 resource blocks across 3 symbols). The transmitting UE 115 may select the resource blocks in which to puncture subcarriers (e.g., may select 2 resource blocks as mod(UE identifier, 5) and send the IMR over the selected resource blocks, such as 2 and 7). Each resource block may have 12 subcarriers, which may mean the chance of a colliding IMR is relatively small (e.g., $\frac{1}{30}$). In some examples, the transmitting UE 115 may perform a symbol offset or may employ other techniques to reduce the probability of the IMRs colliding.

In some cases, UE 115-*d* may decode the sidelink control information 320 including the interference measurement configuration. For example, UE 115-*d* may decode sidelink control information 320-*a* from UE 115-*e* and sidelink control information 320-*b* from UE 115-*f* Subsequently, UE 115-*d* may receive signal 310-*a* from UE 115-*e*, signal 310-*b* from UE 115-*f*, or both. In some examples, a signal 310 (e.g., signal 310-*a*, signal 310-*b*, or both) may be a DMRS. UE 115-*d* may determine the location of the signal 310 and the IMRs based on sidelink control information 320. UE 115-*d* may perform a sidelink interference measurement at 325 for each signal 310 received over a different sidelink communication link 305. For example, UE 115-*d* may measure received signal strength (e.g., RSSI) over one or more IMR resources indicated in sidelink control information 320-*a*, sidelink control information 320-*b*, or both for each TRP.

In some cases, UE 115-*d* may determine whether to process each signal 310 received over a different sidelink communication link 305 in combination or separately across TRPs based on the sidelink interference measurements. For example, UE 115-*d* may combine the signals 310 (e.g., signal 310-*a* received over sidelink communication link 305-*a*, signal 310-*a* received over sidelink communication link 305-*b*, signal 310-*b* received over sidelink communication link 305-*c*, or a combination) based on the sidelink interference measurement for each signal 310 received over a different sidelink communication link 305 at 325 having a value less than or equal to a threshold interference. In some examples, when UE 115-*d* has more than two TRPs, UE 115-*d* may combine over a set of TRPs when the sidelink interference measurements are less than a threshold interference.

In some other examples, UE 115-*d* may process the signals 310 (e.g., signal 310-*a* received over sidelink communication link 305-*a*, signal 310-*a* received over sidelink communication link 305-*b*, signal 310-*b* received over sidelink communication link 305-*c*, or a combination) separately based on at least one sidelink interference measurement having a value greater than a threshold interference. For example, if an energy per resource element (EPRE) value, an RSSI value, or both for at least one signal 310 received over a sidelink communication link 305 is greater than the threshold value, UE 115-*d* may process the signals 310 separately.

In some cases, UE 115-*d* may perform an interference cancellation operation based on determining the signals 310 (e.g., a DMRS pattern for signals 310) are non-orthogonal. UE 115-*d* may use the sidelink interference measurement, such as an RSSI value, an EPRE value, or both, on an IMR as an offset in the interference cancellation operation.

In some cases, UE 115-*e* and UE 115-*f* may determine to send sidelink control information 320-*a* and sidelink control information 320-*b* including an interference measurement configuration, respectively, based on determining UE 115-*d* is a multi-TRP UE 115, determining the wireless communications system 200 is operating in a high congestion network, or both. For example, the transmitting UE 115, such as UE 115-*e*, UE 115-*f*, or both, may determine the network is congested based on performing a channel busy ratio (CBR) measurement or receiving a CBR measurement from one or more surrounding UEs 115. Additionally or alternatively, the transmitting UE 115 may determine the network is congested based on frequent retransmissions, a relatively high number of packet failures, or the like. In some examples, the transmitting UE 115 may determine one or more surrounding UEs 115 is a multi-TRP UE 115. For example, the transmitting UE 115 may establish a unicast communication link with a multi-TRP UE 115 based on receiving an RRC indication of the multi-TRP UE 115. In some other examples, the transmitting UE 115 may receive a broadcast transmission, a multicast transmission, or both including an indication of one or more IMRs in sidelink control information 320. The transmitting UE 115 may infer the presence of a multi-TRP UE 115 based on the transmission including the indication of the one or more IMRs.

Figure 4:
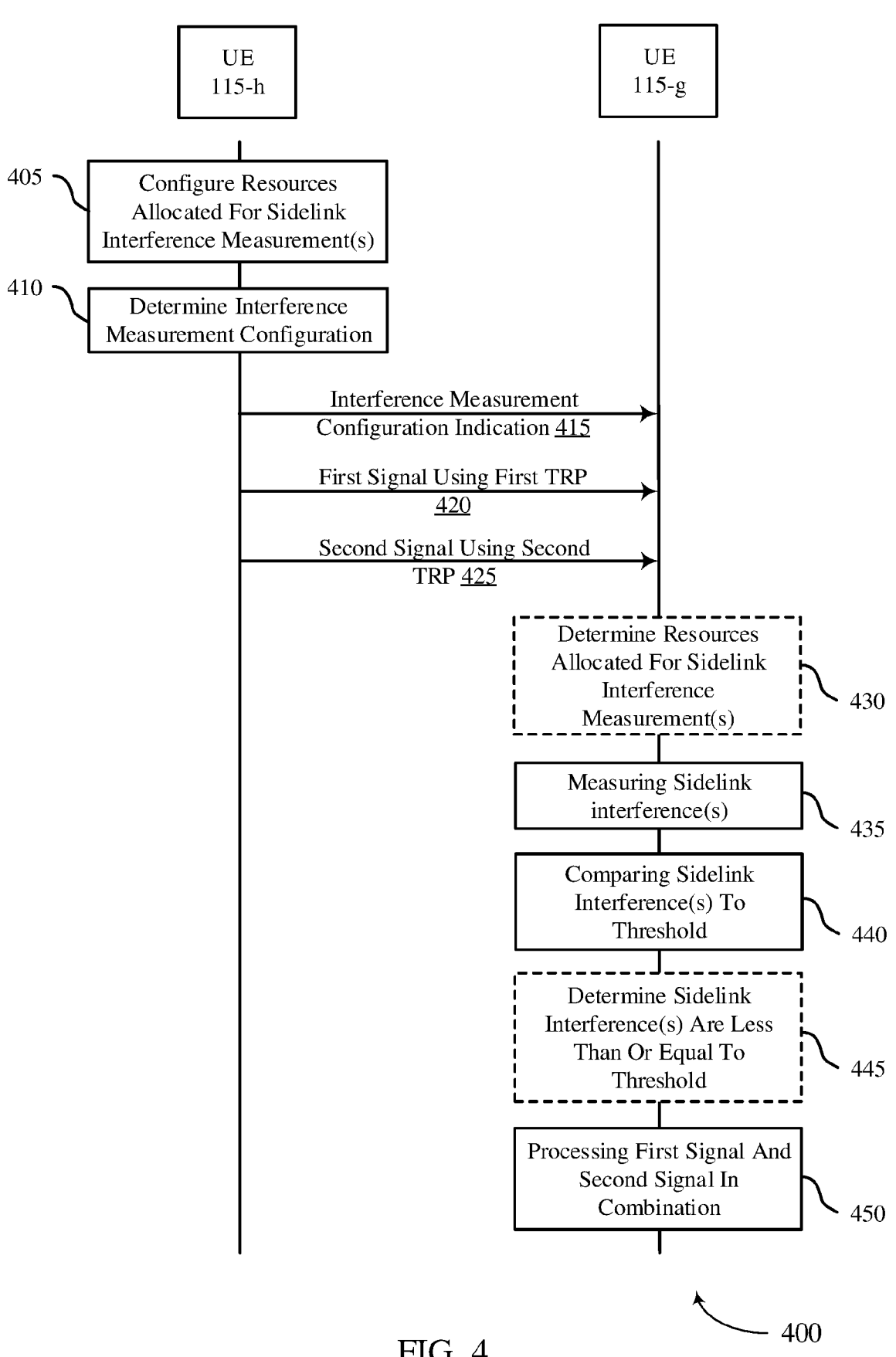
FIGS. 4 and 5 illustrates examples of process flows that support sidelink reception with multiple TRPs in accordance with aspects of the present disclosure.

FIG. 4 illustrates an example of a process flow 400 that supports sidelink reception with multiple TRPs in accordance with aspects of the present disclosure. In some examples, process flow 400 may implement aspects of wireless communication system 100, wireless communications system 200, wireless communications system 300, or a combination. The process flow 400 may illustrate an example of a UE 115, such as UE 115-*g* measuring sidelink interference from one or more signals (e.g., from UE 115-*h*) and determining to process the signals in combination based on an interference threshold. Alternative examples of the following may be implemented, where some processes are performed in a different order than described or are not performed. In some cases, processes may include additional features not mentioned below, or further processes may be added.

At 405, UE 115-*h* may configure one or more resources allocated for sidelink interference measurements across multiple TRPs at UE 115-*g*.

At 410, UE 115-*h* may determine an interference measurement configuration for indicating the configured resource allocated for the sidelink interference measurements. In some examples, UE 115-*h* may transmit the interference measurement configuration based on determining the level of network congestions exceeds a congestion threshold. Additionally or alternatively, UE 115-*h* may identify the presence of UE 115-*g* (e.g., a UE 115 having multiple TRPs) and may transmit the indication of the interference measurement configuration based on identifying the presence of UE 115-*g*. For example, UE 115-*h* may receive control signaling indicating a capability of UE 115-*g* having multiple TRPs, may receive control signaling including an indication of additional resources allocated for side-link interference measurements, or both.

At 415, UE 115-*g* may receive an indication of an interference measurement configuration from UE 115-*h*. The interference measurement configuration may indicate one or more resources allocated for sidelink interference measurements for one or more signals across multiple TRPs. For example, UE 115-*g* may receive sidelink control information from UE 115-*h* indicating the interference measurement configuration. In some examples, the one or more resources allocated for sidelink interference measurements may be zero-power IMRs.

At 420 and 425, UE 115-*g* may receive a first signal from UE 115-*h* using a first TRP and a second signal from UE 115-*h* using a second TRP. In some examples, the first signal and the second signal are part of a broadcast transmission, a multicast transmission, or both from UE 115-*h*.

At 430, UE 115-*g* may determine the one or more resources allocated for the sidelink interference measurements based on an index indicated by the interference measurement configuration, based on a formula, based on one or more randomly punctured resources, or a combination. For example, UE 115-*g* may receive an indication of an index in the interference measurement configuration. The index may indicate a resource pattern from a set of config-ured resource patterns. In some examples, the formula may be a set of numerical operations that UE 115-*h*, UE 115-*g*, or both perform to determine the resources allocated for the sidelink interference measurements. UE 115-*h* may include an indication of the determined resources allocated for the sidelink interference measurements in the interference mea-surement configuration. In some other examples, UE 115-*g* may receive an indication of a bit map for the randomly punctured resources in the interference measurement con-figuration. UE 115-*g* may identify the resources allocated for the sidelink interference measurements based on the bit map.

At 435, UE 115-*g* may measure a sidelink interference for the first signal and a sidelink interference for the second signal based on the interference measurement configuration. For example, UE 115-*g* may measure a received signal strength of the first signal and the second signal (e.g., an RSSI, an EPRE, or both) over the resource allocated for the sidelink interference measurements.

At 440, UE 115-*g* may compare each sidelink interference from the sidelink interference measurement at 435 to an interference threshold. For example, at 445, UE 115-*g* may determine each sidelink interference measurement (e.g., for the first signal and the second signal) are less than or equal to the interference threshold.

At 450, UE 115-*g* may process (e.g., decode) the first signal and the second signal in combination over the first TRP and the second TRP based on determining each sidelink interference is less than or equal to the interference thresh-old.

In some examples, UE 115-*g* may perform an interference cancelation operation based on the measured sidelink inter-ferences. For example, UE 115-*g* may determine one or more reference signals of the first signal are non-orthogonal to one or more reference signals of the second signal. UE 115-*g* may offset the non-orthogonality between the refer-ence signals based on the sidelink interference measure-ments.

Figure 5:
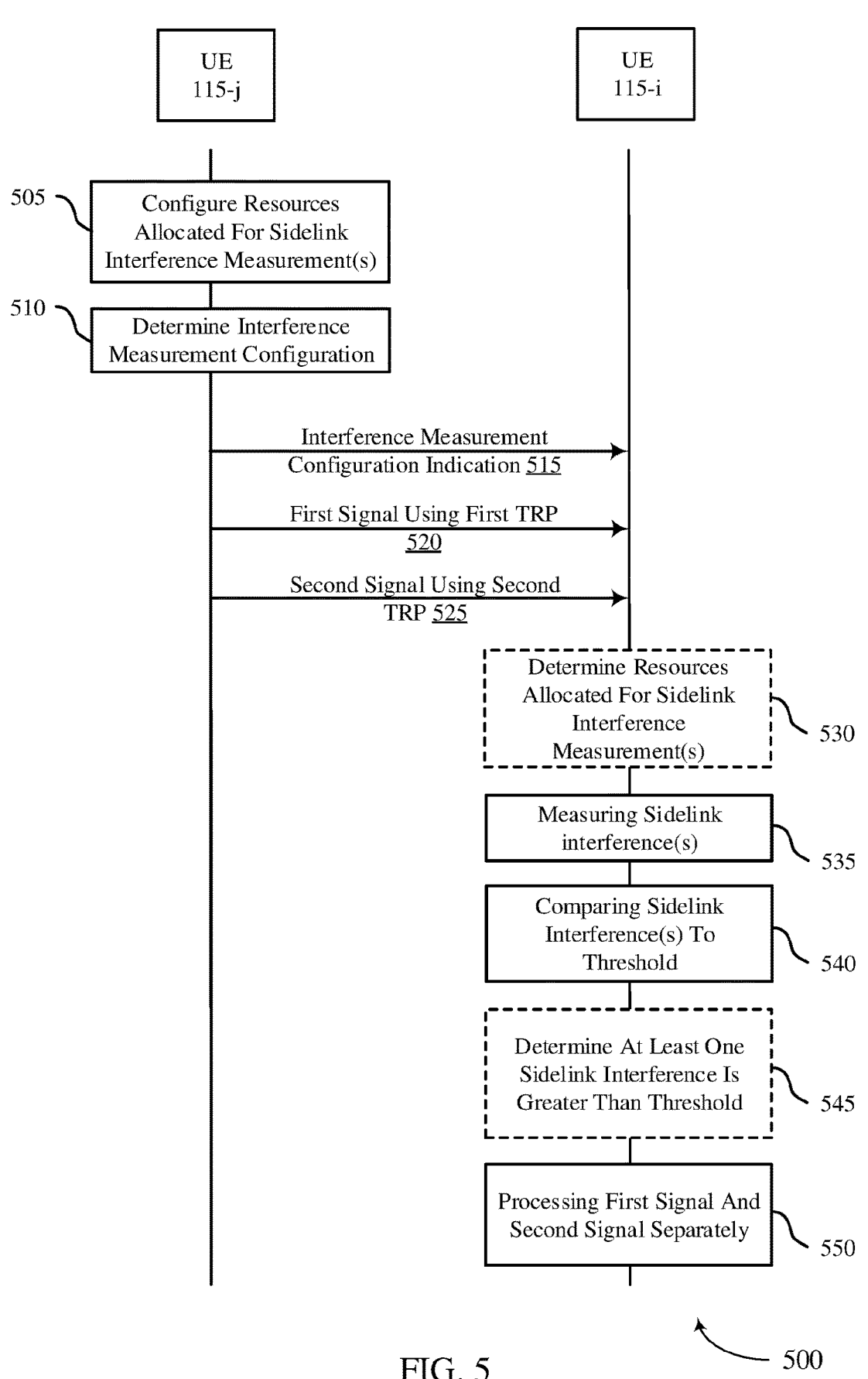

FIG. 5 illustrates an example of a process flow 500 that supports sidelink reception with multiple TRPs in accor-dance with aspects of the present disclosure. In some examples, process flow 500 may implement aspects of wireless communication system 100, wireless communica-tions system 200, wireless communications system 300, or a combination. The process flow 500 may illustrate an example of a UE 115, such as UE 115-*i* measuring sidelink interference from one or more signals (e.g., from UE 115-*j*) and determining to process the signals separately based on an interference threshold. Alternative examples of the fol-lowing may be implemented, where some processes are performed in a different order than described or are not performed. In some cases, processes may include additional features not mentioned below, or further processes may be added.

At 505, UE 115-*j* may configure one or more resources allocated for sidelink interference measurements across multiple TRPs at UE 115-*i*.

At 510, UE 115-*j* may determine an interference mea-surement configuration for indicating the configured resource allocated for the sidelink interference measure-ments. In some examples, UE 115-*j* may transmit the interference measurement configuration based on determin-ing the level of network congestions exceeds a congestion threshold. Additionally or alternatively, UE 115-*j* may iden-tify the presence of UE 115-*i* (e.g., a UE 115 having multiple TRPs) and may transmit the indication of the interference measurement configuration based on identifying the pres-ence of UE 115-*i*. For example, UE 115-*j* may receive control signaling indicating a capability of UE 115-*i* having multiple TRPs, may receive control signaling including an indication of additional resources allocated for sidelink interference measurements, or both.

At 515, UE 115-*i* may receive an indication of an inter-ference measurement configuration from UE 115-*j*. The interference measurement configuration may indicate one or more resources allocated for sidelink interference measure-ments for one or more signals across multiple TRPs. For example, UE 115-*i* may receive sidelink control information from UE 115-*j* indicating the interference measurement configuration. In some examples, the one or more resources allocated for sidelink interference measurements may be zero-power IMRs.

At 520 and 525, UE 115-*i* may receive a first signal from UE 115-*j* using a first TRP and a second signal from UE 115-*j* using a second TRP. In some examples, the first signal and the second signal are part of a broadcast transmission, a multicast transmission, or both from UE 115-*j*.

At 530, UE 115-*i* may determine the one or more resources allocated for the sidelink interference measure-ments based on an index indicated by the interference measurement configuration, based on a formula, based on one or more randomly punctured resources, or a combina-tion. For example, UE 115-*i* may receive an indication of an index in the interference measurement configuration. The index may indicate a resource pattern from a set of config-ured resource patterns. In some examples, the formula may be a set of numerical operations that UE 115-*j*, UE 115-*i*, or both perform to determine the resources allocated for the sidelink interference measurements. UE 115-*j* may include an indication of the determined resources allocated for the sidelink interference measurements in the interference mea-surement configuration. In some other examples, UE 115-*i* may receive an indication of a bit map for the randomly punctured resources in the interference measurement con-figuration. UE 115-*i* may identify the resources allocated for the sidelink interference measurements based on the bit map.

At 535, UE 115-*i* may measure a sidelink interference for the first signal and a sidelink interference for the second signal based on the interference measurement configuration. For example, UE 115-*i* may measure a received signal strength of the first signal and the second signal (e.g., an RSSI, an EPRE, or both) over the resource allocated for the sidelink interference measurements.

At 540, UE 115-*i* may compare each sidelink interference from the sidelink interference measurement at 535 to an interference threshold. For example, at 545, UE 115-*i* may determine at least one sidelink interference measurement (e.g., for the first signal and the second signal) is greater than the interference threshold.

At 550, UE 115-*i* may process (e.g., decode) the first signal and the second signal separately across the first TRP and the second TRP based on determining at least one sidelink interference is greater than the interference threshold.

In some examples, UE 115-*i* may perform an interference cancelation operation based on the measured sidelink interferences. For example, UE 115-*i* may determine one or more reference signals of the first signal are non-orthogonal to one or more reference signals of the second signal. UE 115-*i* may offset the non-orthogonality between the reference signals based on the sidelink interference measurements.

Figure 6:
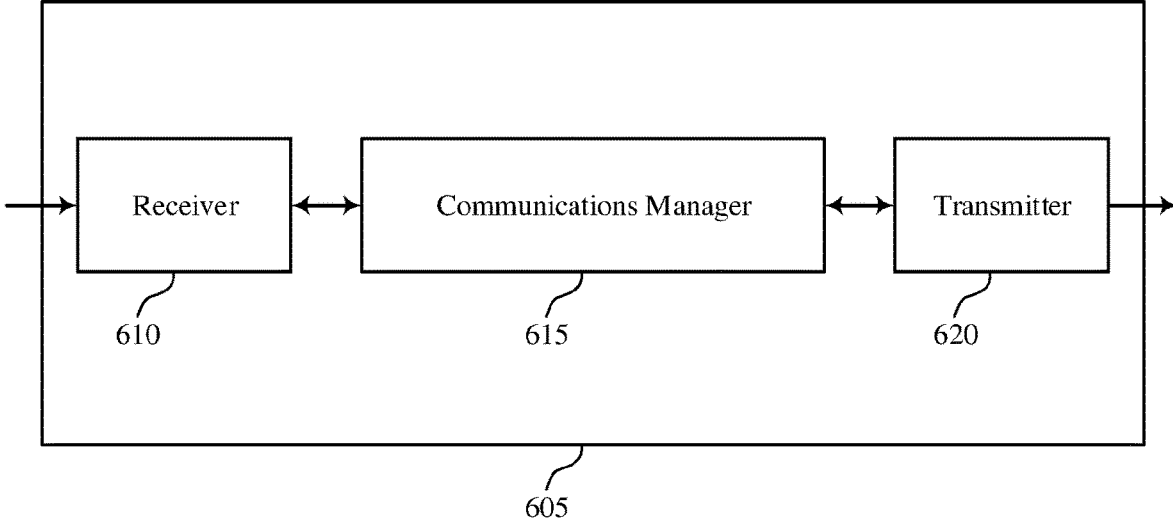
FIGS. 6 and 7 show block diagrams of devices that support sidelink reception with multiple TRPs in accordance with aspects of the present disclosure.

FIG. 6 shows a block diagram 600 of a device 605 that supports sidelink reception with multiple TRPs in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to sidelink reception with multiple TRPs, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive an indication of an interference measurement configuration indicating resources allocated for sidelink interference measurements across multiple TRPs, receive a first signal from a second UE using a first TRP of the first UE and a second signal from the second UE using a second TRP of the first UE, measure a first sidelink interference for the first signal and a second sidelink interference for the second signal based on the interference measurement configuration, compare the first sidelink interference and the second sidelink interference to a sidelink interference threshold, and process the first signal and the second signal in combination over the first TRP and the second TRP or separately across the first TRP and the second TRP based on the comparing. The communications manager 615 may also configure resources allocated for sidelink interference measurements across multiple TRPs, determine an interference measurement configuration for indicating the configured resources allocated for the sidelink interference measurements across multiple TRPs, and transmit an indication of the interference measurement configuration. The communications manager 615 may be an example of aspects of the communications manager 910 described herein.

The actions performed by the communications manager 615 as described herein may be implemented to realize one or more potential advantages. One implementation may enable a multi-TRP UE to measure sidelink interference from one or more signals based on an interference measurement configuration. The interference measurement configuration may enable the UE to determine whether to process the signals in combination or separately based on an interference threshold, which may improve communication latency (e.g., related to signaling or data retransmissions at the multi-TRP UE), among other advantages.

Based on implementing the interference measurement configuration as described herein, a processor of a UE (e.g., a processor controlling the receiver 610, the communications manager 615, the transmitter 620, or a combination thereof) may reduce the impact or likelihood of inefficient communications due to the UE combining one or more signals with an interference measurement above the threshold. For example, the UE may leverage one or more resources allocated for interference measurements to measure the sidelink interferences and determine whether to process the signals in combination or separately, which may realize improved resource allocation at the UE, among other benefits.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a field-programmable gate-array (FPGA) or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
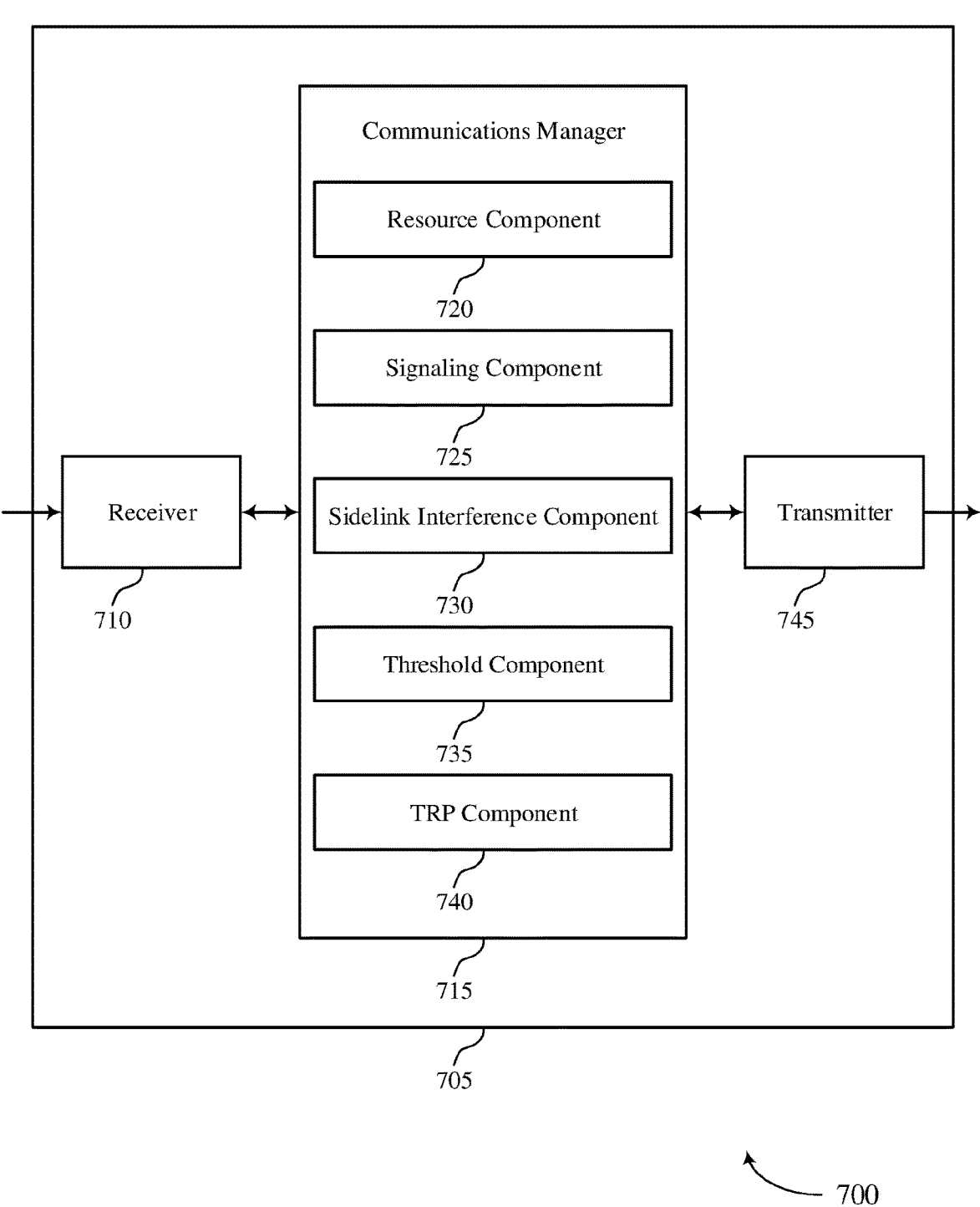

FIG. 7 shows a block diagram 700 of a device 705 that supports sidelink reception with multiple TRPs in accordance with aspects of the present disclosure. The device 705 may be an example of aspects of a device 605, or a UE 115 as described herein. The device 705 may include a receiver 710, a communications manager 715, and a transmitter 745. The device 705 may also include a processor. Each of these components may be in communication with one another (e.g., via one or more buses).

The receiver 710 may receive information such as packets, user data, or control information associated with various information channels (e.g., control channels, data channels, and information related to sidelink reception with multiple TRPs, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a resource component 720, a signaling component 725, a sidelink interference component 730, a threshold component 735, and a TRP component 740. The communications manager 715 may be an example of aspects of the communications manager 910 described herein.

The resource component 720 may receive an indication of an interference measurement configuration indicating resources allocated for sidelink interference measurements across multiple TRPs. The signaling component 725 may receive a first signal from a second UE using a first TRP of the first UE and a second signal from the second UE using a second TRP of the first UE. The sidelink interference component 730 may measure a first sidelink interference for the first signal and a second sidelink interference for the second signal based on the interference measurement configuration. The threshold component 735 may compare the first sidelink interference and the second sidelink interference to a sidelink interference threshold. The TRP component 740 may process the first signal and the second signal in combination over the first TRP and the second TRP or separately across the first TRP and the second TRP based on the comparing.

The resource component 720 may configure resources allocated for sidelink interference measurements across multiple TRPs. The TRP component 740 may determine an interference measurement configuration for indicating the configured resources allocated for the sidelink interference measurements across multiple TRPs. The sidelink interference component 730 may transmit an indication of the interference measurement configuration.

The transmitter 745 may transmit signals generated by other components of the device 705. In some examples, the transmitter 745 may be collocated with a receiver 710 in a transceiver module. For example, the transmitter 745 may be an example of aspects of the transceiver 920 described with reference to FIG. 9. The transmitter 745 may utilize a single antenna or a set of antennas.

Figure 8:
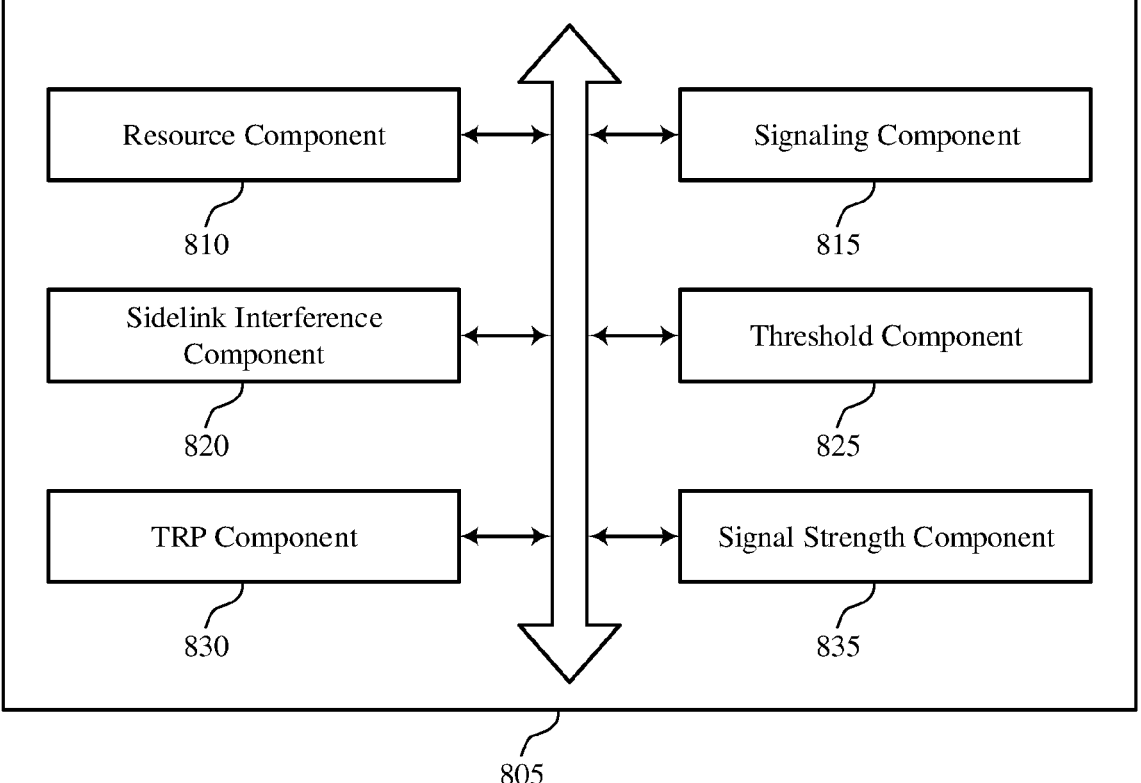
FIG. 8 shows a block diagram of a communications manager that supports sidelink reception with multiple TRPs in accordance with aspects of the present disclosure.

FIG. 8 shows a block diagram 800 of a communications manager 805 that supports sidelink reception with multiple TRPs in accordance with aspects of the present disclosure. The communications manager 805 may be an example of aspects of a communications manager 615, a communications manager 715, or a communications manager 910 described herein. The communications manager 805 may include a resource component 810, a signaling component 815, a sidelink interference component 820, a threshold component 825, a TRP component 830, and a signal strength component 835. Each of these modules may communicate, directly or indirectly, with one another (e.g., via one or more buses).

The resource component 810 may receive an indication of an interference measurement configuration indicating resources allocated for sidelink interference measurements across multiple TRPs. The signaling component 815 may receive a first signal from a second UE using a first TRP of the first UE and a second signal from the second UE using a second TRP of the first UE. The sidelink interference component 820 may measure a first sidelink interference for the first signal and a second sidelink interference for the second signal based on the interference measurement configuration. The threshold component 825 may compare the first sidelink interference and the second sidelink interference to a sidelink interference threshold. The TRP component 830 may process the first signal and the second signal in combination over the first TRP and the second TRP or separately across the first TRP and the second TRP based on the comparing.

In some examples, the resource component 810 may identify the resources allocated for the sidelink interference measurements based on an index indicated by the interference measurement configuration, where the index indicates a resource pattern from a set of configured resource patterns. In some examples, the resource component 810 may determine the resources allocated for the sidelink interference measurements based on a formula, where the interference measurement configuration indicates that the resources allocated for the sidelink interference measurements have been allocated. In some examples, the resource component 810 may identify the resources allocated for the sidelink interference measurements as randomly punctured resources based on a bit map indicated by the interference measurement configuration.

The signal strength component 835 may receive sidelink control information from the second UE, the sidelink control information including the interference measurement configuration. In some examples, the signal strength component 835 may measure received signal strength of the first signal and the second signal over the resources allocated for the sidelink interference measurements.

In some examples, the threshold component 825 may determine the first sidelink interference and the second sidelink interference is less than or equal to the sidelink interference threshold. In some examples, the threshold component 825 may decode the first signal and the second signal in combination over the first TRP and the second TRP based on determining the first sidelink interference and the second sidelink interference is less than or equal to the sidelink interference threshold. In some examples, the threshold component 825 may measure the first sidelink interference and the second sidelink interference based on an energy per resource element, a received signal strength indicator, or both corresponding to the first signal and the second signal.

In some examples, the threshold component 825 may determine the first sidelink interference or the second sidelink interference is greater than the sidelink interference threshold. In some examples, the threshold component 825 may decode the first signal and the second signal separately across the first TRP and the second TRP based on determining the first sidelink interference or the second sidelink interference is greater than the sidelink interference threshold.

In some examples, the sidelink interference component 820 may perform an interference cancelation operation based on the first sidelink interference and the second sidelink interference. In some examples, the sidelink interference component 820 may determine one or more reference signals associated with the first signal are non-orthogonal to one or more reference signals associated with the second signal. In some examples, the sidelink interference component 820 may offset a non-orthogonality between the one or more reference signals associated with the first signal and the one or more reference signals associated with the second signal, where the offsetting is based on the first sidelink interference and the second sidelink interference.

In some cases, the first signal and the second signal may be associated with a broadcast transmission, a multicast transmission, or any combination. The resources allocated for the sidelink interference measurements may include zero-power interference measurement resources.

In some examples, the resource component 810 may configure resources allocated for sidelink interference measurements across multiple TRPs. In some examples, the TRP component 830 may determine an interference measurement configuration for indicating the configured resources allocated for the sidelink interference measurements across multiple TRPs. In some examples, the sidelink interference component 820 may transmit an indication of the interference measurement configuration.

In some examples, the resource component 810 may select a resource pattern from a set of configured resource patterns, where the interference measurement configuration includes an index indicating the selected resource pattern. In some examples, the resource component 810 may determine the configured resources allocated for the sidelink interference measurements based on a formula, where the interference measurement configuration indicates that the configured resources allocated for the sidelink interference measurements have been allocated. In some examples, the resource component 810 may puncture one or more resource elements with the configured resources allocated for sidelink measurements, where the interference measurement configuration includes a bit map indicating the configured resources allocated for sidelink measurements.

In some examples, the threshold component 825 may determine a level of network congestion exceeds a congestion threshold, where transmitting the indication of the interference measurement configuration is based on determining the level of network congestion exceeds the congestion threshold. In some examples, the TRP component 830 may identify a presence of a UE having a set of TRPs, where transmitting the indication of the interference measurement configuration is based on identifying the presence of the UE having the set of TRPs. In some examples, the TRP component 830 may receive control signaling indicating a capability of the UE having the set of TRPs. In some examples, the TRP component 830 may receive control signaling including an indication of additional resources allocated for the sidelink interference measurements.

Figure 9:
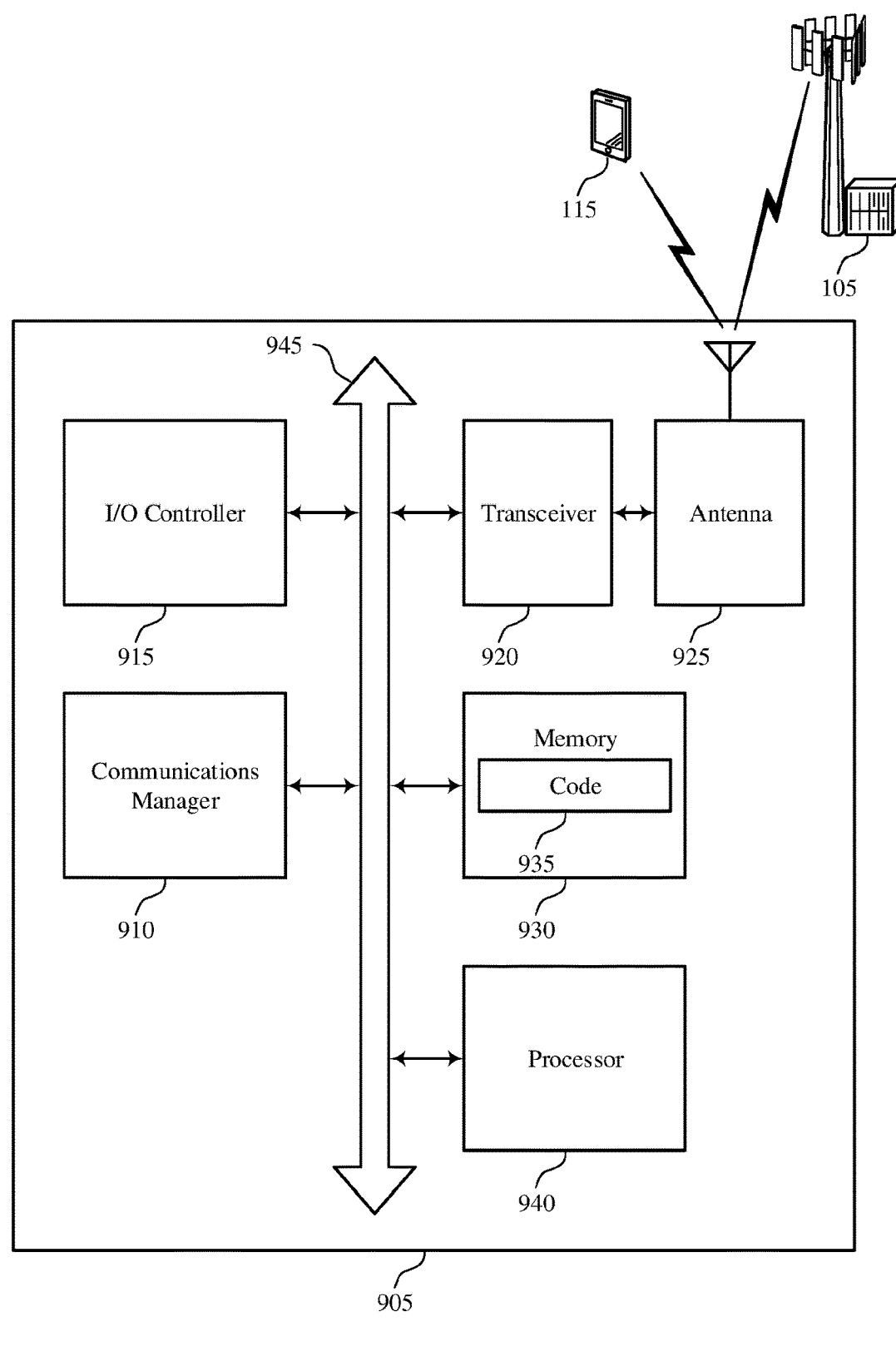
FIG. 9 shows a diagram of a system including a device that supports sidelink reception with multiple TRPs in accordance with aspects of the present disclosure.

FIG. 9 shows a diagram of a system 900 including a device 905 that supports sidelink reception with multiple TRPs in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive an indication of an interference measurement configuration indicating resources allocated for sidelink interference measurements across multiple TRPs, receive a first signal from a second UE using a first TRP of the first UE and a second signal from the second UE using a second TRP of the first UE, measure a first sidelink interference for the first signal and a second sidelink interference for the second signal based on the interference measurement configuration, compare the first sidelink interference and the second sidelink interference to a sidelink interference threshold, and process the first signal and the second signal in combination over the first TRP and the second TRP or separately across the first TRP and the second TRP based on the comparing. The communications manager 910 may also configure resources allocated for sidelink interference measurements across multiple TRPs, determine an interference measurement configuration for indicating the configured resources allocated for the sidelink interference measurements across multiple TRPs, and transmit an indication of the interference measurement configuration.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include random-access memory (RAM) and read-only memory (ROM). The memory 930 may store computer-readable, computer-executable code 935 including instructions that, when executed, cause the processor to perform various functions described herein. In some cases, the memory 930 may contain, among other things, a basic I/O system (BIOS) which may control basic hardware or software operation such as the interaction with peripheral components or devices.

The processor 940 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting sidelink reception with multiple TRPs).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

FIG. 10 shows a flowchart illustrating a method 1000 that supports sidelink reception with multiple TRPs in accordance with aspects of the present disclosure. The operations of method 1000 may be implemented by a UE 115 or its components as described herein. For example, the operations of method 1000 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1005, the UE may receive an indication of an interference measurement configuration indicating resources allocated for sidelink interference measurements across multiple TRPs. The operations of 1005 may be performed according to the methods described herein. In some examples, aspects of the operations of 1005 may be performed by a resource component as described with reference to FIGS. 6 through 9.

At 1010, the UE may receive a first signal from a second UE using a first TRP of the first UE and a second signal from the second UE using a second TRP of the first UE. The operations of 1010 may be performed according to the methods described herein. In some examples, aspects of the operations of 1010 may be performed by a signaling component as described with reference to FIGS. 6 through 9.

At 1015, the UE may measure a first sidelink interference for the first signal and a second sidelink interference for the second signal based on the interference measurement configuration. The operations of 1015 may be performed according to the methods described herein. In some examples, aspects of the operations of 1015 may be performed by a sidelink interference component as described with reference to FIGS. 6 through 9.

At 1020, the UE may compare the first sidelink interference and the second sidelink interference to a sidelink interference threshold. The operations of 1020 may be performed according to the methods described herein. In some examples, aspects of the operations of 1020 may be performed by a threshold component as described with reference to FIGS. 6 through 9.

At 1025, the UE may process the first signal and the second signal in combination over the first TRP and the second TRP or separately across the first TRP and the second TRP based on the comparing. The operations of 1025 may be performed according to the methods described herein. In some examples, aspects of the operations of 1025 may be performed by a TRP component as described with reference to FIGS. 6 through 9.

FIG. 11 shows a flowchart illustrating a method 1100 that supports sidelink reception with multiple TRPs in accordance with aspects of the present disclosure. The operations of method 1100 may be implemented by a UE 115 or its components as described herein. For example, the operations of method 1100 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1105, the UE may receive an indication of an interference measurement configuration indicating resources allocated for sidelink interference measurements across multiple TRPs. The operations of 1105 may be performed according to the methods described herein. In some examples, aspects of the operations of 1105 may be performed by a resource component as described with reference to FIGS. 6 through 9.

At 1110, the UE may identify the resources allocated for the sidelink interference measurements based on an index indicated by the interference measurement configuration, where the index indicates a resource pattern from a set of configured resource patterns. The operations of 1110 may be performed according to the methods described herein. In some examples, aspects of the operations of 1110 may be performed by a resource component as described with reference to FIGS. 6 through 9.

At 1115, the UE may receive a first signal from a second UE using a first TRP of the first UE and a second signal from the second UE using a second TRP of the first UE. The operations of 1115 may be performed according to the methods described herein. In some examples, aspects of the operations of 1115 may be performed by a signaling component as described with reference to FIGS. 6 through 9.

At 1120, the UE may measure a first sidelink interference for the first signal and a second sidelink interference for the second signal based on the interference measurement configuration. The operations of 1120 may be performed according to the methods described herein. In some examples, aspects of the operations of 1120 may be performed by a sidelink interference component as described with reference to FIGS. 6 through 9.

At 1125, the UE may compare the first sidelink interference and the second sidelink interference to a sidelink interference threshold. The operations of 1125 may be performed according to the methods described herein. In some examples, aspects of the operations of 1125 may be performed by a threshold component as described with reference to FIGS. 6 through 9.

At 1130, the UE may process the first signal and the second signal in combination over the first TRP and the second TRP or separately across the first TRP and the second TRP based on the comparing. The operations of 1130 may be performed according to the methods described herein. In some examples, aspects of the operations of 1130 may be performed by a TRP component as described with reference to FIGS. 6 through 9.

Figure 12:
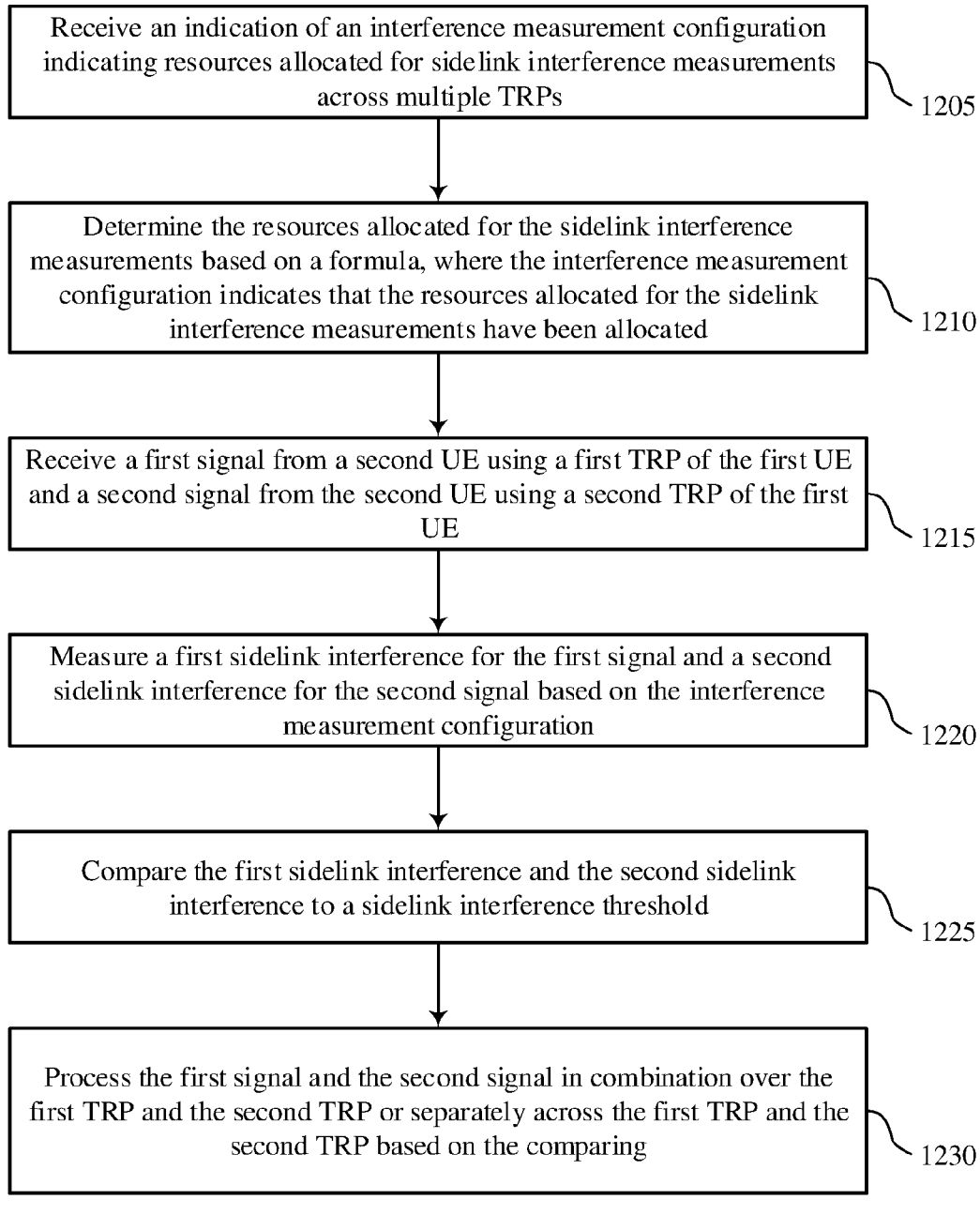

FIG. 12 shows a flowchart illustrating a method 1200 that supports sidelink reception with multiple TRPs in accordance with aspects of the present disclosure. The operations of method 1200 may be implemented by a UE 115 or its components as described herein. For example, the operations of method 1200 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1205, the UE may receive an indication of an interference measurement configuration indicating resources allocated for sidelink interference measurements across multiple TRPs. The operations of 1205 may be performed according to the methods described herein. In some examples, aspects of the operations of 1205 may be performed by a resource component as described with reference to FIGS. 6 through 9.

At 1210, the UE may determine the resources allocated for the sidelink interference measurements based on a formula, where the interference measurement configuration indicates that the resources allocated for the sidelink interference measurements have been allocated. The operations of 1210 may be performed according to the methods described herein. In some examples, aspects of the operations of 1210 may be performed by a resource component as described with reference to FIGS. 6 through 9.

At 1215, the UE may receive a first signal from a second UE using a first TRP of the first UE and a second signal from the second UE using a second TRP of the first UE. The operations of 1215 may be performed according to the methods described herein. In some examples, aspects of the operations of 1215 may be performed by a signaling component as described with reference to FIGS. 6 through 9.

At 1220, the UE may measure a first sidelink interference for the first signal and a second sidelink interference for the second signal based on the interference measurement configuration. The operations of 1220 may be performed according to the methods described herein. In some examples, aspects of the operations of 1220 may be performed by a sidelink interference component as described with reference to FIGS. 6 through 9.

At 1225, the UE may compare the first sidelink interference and the second sidelink interference to a sidelink interference threshold. The operations of 1225 may be performed according to the methods described herein. In some examples, aspects of the operations of 1225 may be performed by a threshold component as described with reference to FIGS. 6 through 9.

At 1230, the UE may process the first signal and the second signal in combination over the first TRP and the second TRP or separately across the first TRP and the second TRP based on the comparing. The operations of 1230 may be performed according to the methods described herein. In some examples, aspects of the operations of 1230 may be performed by a TRP component as described with reference to FIGS. 6 through 9.

FIG. 13 shows a flowchart illustrating a method 1300 that supports sidelink reception with multiple TRPs in accordance with aspects of the present disclosure. The operations of method 1300 may be implemented by a UE 115 or its components as described herein. For example, the operations of method 1300 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1305, the UE may receive an indication of an interference measurement configuration indicating resources allocated for sidelink interference measurements across multiple TRPs. The operations of 1305 may be performed according to the methods described herein. In some examples, aspects of the operations of 1305 may be performed by a resource component as described with reference to FIGS. 6 through 9.

At 1310, the UE may identify the resources allocated for the sidelink interference measurements as randomly punctured resources based on a bit map indicated by the interference measurement configuration. The operations of 1310 may be performed according to the methods described herein. In some examples, aspects of the operations of 1310 may be performed by a resource component as described with reference to FIGS. 6 through 9.

At 1315, the UE may receive a first signal from a second UE using a first TRP of the first UE and a second signal from the second UE using a second TRP of the first UE. The operations of 1315 may be performed according to the methods described herein. In some examples, aspects of the operations of 1315 may be performed by a signaling component as described with reference to FIGS. 6 through 9.

At 1320, the UE may measure a first sidelink interference for the first signal and a second sidelink interference for the second signal based on the interference measurement configuration. The operations of 1320 may be performed according to the methods described herein. In some examples, aspects of the operations of 1320 may be performed by a sidelink interference component as described with reference to FIGS. 6 through 9.

At 1325, the UE may compare the first sidelink interference and the second sidelink interference to a sidelink interference threshold. The operations of 1325 may be performed according to the methods described herein. In some examples, aspects of the operations of 1325 may be performed by a threshold component as described with reference to FIGS. 6 through 9.

At 1330, the UE may process the first signal and the second signal in combination over the first TRP and the second TRP or separately across the first TRP and the second TRP based on the comparing. The operations of 1330 may be performed according to the methods described herein. In some examples, aspects of the operations of 1330 may be performed by a TRP component as described with reference to FIGS. 6 through 9.

Figure 14:
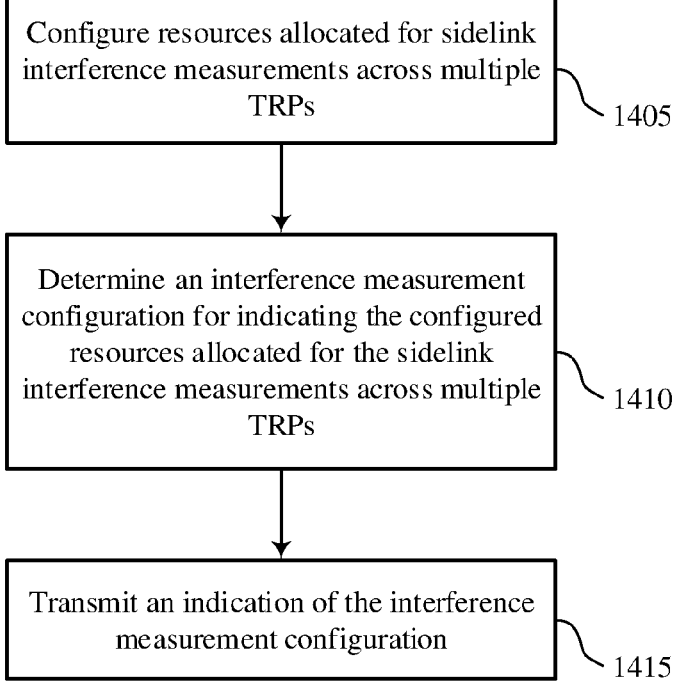

FIG. 14 shows a flowchart illustrating a method 1400 that supports sidelink reception with multiple TRPs in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may configure resources allocated for sidelink interference measurements across multiple TRPs. The operations of 1405 may be performed according to the methods described herein. In some examples, aspects of the operations of 1405 may be performed by a resource component as described with reference to FIGS. 6 through 9.

At 1410, the UE may determine an interference measurement configuration for indicating the configured resources allocated for the sidelink interference measurements across multiple TRPs. The operations of 1410 may be performed according to the methods described herein. In some examples, aspects of the operations of 1410 may be performed by a TRP component as described with reference to FIGS. 6 through 9.

At 1415, the UE may transmit an indication of the interference measurement configuration. The operations of 1415 may be performed according to the methods described herein. In some examples, aspects of the operations of 1415 may be performed by a sidelink interference component as described with reference to FIGS. 6 through 9.

FIG. 15 shows a flowchart illustrating a method 1500 that supports sidelink reception with multiple TRPs in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may identify a presence of a UE having a set of TRPs. The operations of 1505 may be performed according to the methods described herein. In some examples, aspects of the operations of 1505 may be performed by a TRP component as described with reference to FIGS. 6 through 9.

At 1510, the UE may configure resources allocated for sidelink interference measurements across multiple TRPs. The operations of 1510 may be performed according to the methods described herein. In some examples, aspects of operations of 1510 may be performed by a resource component as described with reference to FIGS. 6 through 9.

At 1515, the UE may determine an interference measurement configuration for indicating the configured resources allocated for the sidelink interference measurements across multiple TRPs. The operations of 1515 may be performed according to the methods described herein. In some examples, aspects of the operations of 1515 may be performed by a TRP component as described with reference to FIGS. 6 through 9.

At 1520, the UE may transmit an indication of the interference measurement configuration based on identifying the presence of the UE having the set of TRPs. The operations of 1520 may be performed according to the methods described herein. In some examples, aspects of the operations of 1520 may be performed by a sidelink interference component as described with reference to FIGS. 6 through 9.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:

receiving an indication of an interference measurement configuration indicating resources allocated for sidelink interference measurements across multiple transmission reception points;

receiving a first signal from a second UE using a first transmission reception point of the first UE and a second signal from the second UE using a second transmission reception point of the first UE;

measuring a first sidelink interference for the first signal and a second sidelink interference for the second signal based at least in part on the interference measurement configuration;

comparing the first sidelink interference and the second sidelink interference to a sidelink interference threshold; and processing the first signal and the second signal in combination over the first transmission reception point and the second transmission reception point or separately across the first transmission reception point and the second transmission reception point based at least in part on the comparing.

2. The method of claim 1, further comprising:

identifying the resources allocated for the sidelink interference measurements based at least in part on an index indicated by the interference measurement configuration, wherein the index indicates a resource pattern from a plurality of configured resource patterns.

3. The method of claim 1, further comprising:

determining the resources allocated for the sidelink interference measurements based at least in part on a formula, wherein the interference measurement configuration indicates that the resources allocated for the sidelink interference measurements have been allocated.

4. The method of claim 1, further comprising:

identifying the resources allocated for the sidelink interference measurements as randomly punctured resources based at least in part on a bit map indicated by the interference measurement configuration.

5. The method of claim 1, wherein measuring the first sidelink interference and the second sidelink interference comprises:

receiving sidelink control information from the second UE, the sidelink control information comprising the interference measurement configuration; and measuring received signal strength of the first signal and the second signal over the resources allocated for the sidelink interference measurements.

6. The method of claim 1, wherein processing the first signal and the second signal comprises:

determining the first sidelink interference and the second sidelink interference is less than or equal to the sidelink interference threshold; and decoding the first signal and the second signal in combination over the first transmission reception point and the second transmission reception point based at least in part on determining the first sidelink interference and the second sidelink interference is less than or equal to the sidelink interference threshold.

7. The method of claim 6, further comprising:

measuring the first sidelink interference and the second sidelink interference based at least in part on an energy per resource element, a received signal strength indicator, or both corresponding to the first signal and the second signal.

8. The method of claim 1, wherein processing the first signal and the second signal comprises:

determining the first sidelink interference or the second sidelink interference is greater than the sidelink interference threshold; and decoding the first signal and the second signal separately across the first transmission reception point and the second transmission reception point based at least in part on determining the first sidelink interference or the second sidelink interference is greater than the sidelink interference threshold.

9. The method of claim 1, further comprising:

performing an interference cancelation operation based at least in part on the first sidelink interference and the second sidelink interference.

10. The method of claim 9, wherein the interference cancelation operation comprises:

determining one or more reference signals associated with the first signal are non-orthogonal to one or more reference signals associated with the second signal; and offsetting a non-orthogonality between the one or more reference signals associated with the first signal and the one or more reference signals associated with the second signal, wherein the offsetting is based at least in part on the first sidelink interference and the second sidelink interference.

11. The method of claim 1, wherein the first signal and the second signal are associated with a broadcast transmission, a multicast transmission, or any combination thereof.

12. The method of claim 1, wherein the resources allocated for the sidelink interference measurements comprise zero-power interference measurement resources.

13. A method for wireless communications at a user equipment (UE), comprising:

configuring resources allocated for sidelink interference measurements across multiple transmission reception points;

determining an interference measurement configuration for indicating the configured resources allocated for the sidelink interference measurements across multiple transmission reception points;

determining a level of network congestion exceeds a congestion threshold; and transmitting, via a sidelink communication, an indication of the interference measurement configuration based at least in part on determining the level of network congestion exceeds the congestion threshold.

14. The method of claim 13, wherein determining the interference measurement configuration comprises:

selecting a resource pattern from a plurality of configured resource patterns, wherein the interference measurement configuration comprises an index indicating the selected resource pattern.

15. The method of claim 13, wherein determining the interference measurement configuration comprises:

determining the configured resources allocated for the sidelink interference measurements based at least in part on a formula, wherein the interference measurement configuration indicates that the configured resources allocated for the sidelink interference measurements have been allocated.

16. The method of claim 13, wherein determining the interference measurement configuration comprises:

puncturing one or more resource elements with the configured resources allocated for sidelink measurements, wherein the interference measurement configuration comprises a bit map indicating the configured resources allocated for sidelink measurements.

17. The method of claim 13, further comprising:

identifying a presence of a UE having a plurality of transmission reception points, wherein transmitting the indication of the interference measurement configuration is based at least in part on identifying the presence of the UE having the plurality of transmission reception points.

18. The method of claim 17, wherein identifying the presence of the UE having the plurality of transmission reception points comprises:

receiving control signaling indicating a capability of the UE having the plurality of transmission reception points.

19. The method of claim 17, wherein identifying the presence of the UE having the plurality of transmission reception points comprises:

receiving control signaling comprising an indication of additional resources allocated for the sidelink interference measurements.

20. The method of claim 13, wherein the configured resources allocated for the sidelink interference measurements comprise zero-power interference measurement resources.

21. An apparatus for wireless communications at a first user equipment (UE), comprising:

one or more processors, one or more memories coupled with the one or more processors; and instructions stored in the one or more memories and executable by the one or more processors to cause the apparatus to:

receive an indication of an interference measurement configuration indicating resources allocated for sidelink interference measurements across multiple transmission reception points;

receive a first signal from a second UE using a first transmission reception point of the first UE and a second signal from the second UE using a second transmission reception point of the first UE;

measure a first sidelink interference for the first signal and a second sidelink interference for the second signal based at least in part on the interference measurement configuration;

compare the first sidelink interference and the second sidelink interference to a sidelink interference threshold; and process the first signal and the second signal in combination over the first transmission reception point and the second transmission reception point or separately across the first transmission reception point and the second transmission reception point based at least in part on the comparing.

22. The apparatus of claim 21, wherein the instructions are further executable by the one or more processors to cause the apparatus to:

identify the resources allocated for the sidelink interference measurements based at least in part on an index indicated by the interference measurement configuration, wherein the index indicates a resource pattern from a plurality of configured resource patterns.

23. The apparatus of claim 21, wherein the instructions are further executable by the one or more processors to cause the apparatus to:

determine the resources allocated for the sidelink interference measurements based at least in part on a formula, wherein the interference measurement configuration indicates that the resources allocated for the sidelink interference measurements have been allocated.

24. The apparatus of claim 21, wherein the instructions are further executable by the one or more processors to cause the apparatus to:

identify the resources allocated for the sidelink interference measurements as randomly punctured resources based at least in part on a bit map indicated by the interference measurement configuration.

25. The apparatus of claim 21, wherein the instructions to measure the first sidelink interference and the second sidelink interference are executable by the one or more processors to cause the apparatus to:

receive sidelink control information from the second UE, the sidelink control information comprising the interference measurement configuration; and measure received signal strength of the first signal and the second signal over the resources allocated for the sidelink interference measurements.

26. The apparatus of claim 21, wherein the instructions to process the first signal and the second signal are executable by the one or more processors to cause the apparatus to:

determine the first sidelink interference and the second sidelink interference is less than or equal to the sidelink interference threshold; and decode the first signal and the second signal in combination over the first transmission reception point and the second transmission reception point based at least in part on determining the first sidelink interference and the second sidelink interference is less than or equal to the sidelink interference threshold.

27. The apparatus of claim 26, wherein the instructions are further executable by the one or more processors to cause the apparatus to:

measure the first sidelink interference and the second sidelink interference based at least in part on an energy per resource element, a received signal strength indicator, or both corresponding to the first signal and the second signal.

28. The apparatus of claim 21, wherein the instructions to process the first signal and the second signal are executable by the one or more processors to cause the apparatus to:

determine the first sidelink interference or the second sidelink interference is greater than the sidelink interference threshold; and decode the first signal and the second signal separately across the first transmission reception point and the second transmission reception point based at least in part on determining the first sidelink interference or the second sidelink interference is greater than the sidelink interference threshold.

29. The apparatus of claim 21, wherein the instructions are further executable by the one or more processors to cause the apparatus to:

perform an interference cancelation operation based at least in part on the first sidelink interference and the second sidelink interference.

30. The apparatus of claim 29, wherein the interference cancelation operation comprises:

determine one or more reference signals associated with the first signal are non-orthogonal to one or more reference signals associated with the second signal; and offset a non-orthogonality between the one or more reference signals associated with the first signal and the one or more reference signals associated with the second signal, wherein the offsetting is based at least in part on the first sidelink interference and the second sidelink interference.

31. The apparatus of claim 21, wherein the first signal and the second signal are associated with a broadcast transmission, a multicast transmission, or any combination thereof.

32. The apparatus of claim 21, wherein the resources allocated for the sidelink interference measurements comprise zero-power interference measurement resources.

33. An apparatus for wireless communications at a user equipment (UE), comprising:

one or more processors, one or more memories coupled with the one or more processors; and instructions stored in the one or more memories and executable by the one or more processors to cause the apparatus to:

configure resources allocated for sidelink interference measurements across multiple transmission reception points;

determine an interference measurement configuration for indicating the configured resources allocated for the sidelink interference measurements across multiple transmission reception points;

determine a level of network congestion exceeds a congestion threshold; and transmit, via a sidelink communication, an indication of the interference measurement configuration based at least in part on determining the level of network congestion exceeds the congestion threshold.

34. An apparatus for wireless communications at a first user equipment (UE), comprising:

means for receiving an indication of an interference measurement configuration indicating resources allocated for sidelink interference measurements across multiple transmission reception points;

means for receiving a first signal from a second UE using a first transmission reception point of the first UE and a second signal from the second UE using a second transmission reception point of the first UE;

means for measuring a first sidelink interference for the first signal and a second sidelink interference for the second signal based at least in part on the interference measurement configuration;

means for comparing the first sidelink interference and the second sidelink interference to a sidelink interference threshold; and means for processing the first signal and the second signal in combination over the first transmission reception point and the second transmission reception point or separately across the first transmission reception point and the second transmission reception point based at least in part on the comparing.

* * * * *